(12) United States Patent
Di Cairano et al.

(10) Patent No.: US 9,983,554 B2
(45) Date of Patent: May 29, 2018

(54) MODEL PREDICTIVE CONTROL WITH UNCERTAINTIES

(71) Applicant: Mitsubishi Electric Research Laboratories, Inc., Cambridge, MA (US)

(72) Inventors: Stefano Di Cairano, Somerville, MA (US); Avishai Weiss, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 347 days.

(21) Appl. No.: 14/552,788

(22) Filed: Nov. 25, 2014

(65) Prior Publication Data
US 2016/0147203 A1    May 26, 2016

(51) Int. Cl.
*G05B 13/04*        (2006.01)
*G05B 15/02*        (2006.01)

(52) U.S. Cl.
CPC .................. *G05B 13/042* (2013.01)

(58) Field of Classification Search
CPC .................................................. G05B 13/042
See application file for complete search history.

(56) References Cited

U.S. PATENT DOCUMENTS

| | | | |
|---|---|---|---|
| 5,659,667 | A | 8/1997 | Buescher et al. |
| 6,826,521 | B1 | 11/2004 | Hess et al. |
| 6,882,889 | B2 | 4/2005 | Fuller et al. |

(Continued)

FOREIGN PATENT DOCUMENTS

| | | |
|---|---|---|
| WO | 2006021125 | 3/2006 |
| WO | 2007024847 | 3/2007 |
| WO | 2011014350 | 3/2011 |

OTHER PUBLICATIONS

Kerrigan, Robust Constraint Satisfaction: Invariant Sets and Predictive Control, Nov. 2000, University of Cambridge. Retrieved from https://spiral.imperial.ac.uk/bitstream/10044/1/4346/1/cued_control_155.pdf on Nov. 15, 2016.*

(Continued)

*Primary Examiner* — Mohammad Ali
*Assistant Examiner* — Joshua Sanders
(74) *Attorney, Agent, or Firm* — Gene Vinokur; James McAleenan; Hironori Tsukamoto

(57) ABSTRACT

A method controls iteratively the operation of the machine with control inputs determined using the model of the machine based on an optimization of a cost function subject to constraints on the control inputs. A current iteration of the method includes determining a current state of the machine after the controlling with a previous control input determined for a previous iteration by optimizing a previous cost function using a previous model of the machine and determining a current model of the machine to reduce a difference between the current state and a state estimated using the previous model of the machine. The cost function is updated during the current iteration based on a difference between the previous model and the current model to produce a current cost function. A current control input for the controlling at the current iteration is determined using the current model and the current cost function.

15 Claims, 15 Drawing Sheets

(56) References Cited

U.S. PATENT DOCUMENTS

| | | | |
|---|---|---|---|
| 7,317,953 | B2 | 1/2008 | Wojsznis et al. |
| 7,599,751 | B2 | 10/2009 | Cutler |
| 8,032,236 | B2 | 10/2011 | Stephenson et al. |
| 8,126,575 | B2 | 2/2012 | Attarwala |
| 8,273,052 | B2 | 9/2012 | Damiano et al. |
| 2004/0107012 | A1* | 6/2004 | Das .................... G05B 13/042 700/53 |
| 2004/0267395 | A1* | 12/2004 | Discenzo ............ G05B 13/024 700/99 |
| 2005/0149209 | A1 | 7/2005 | Wojsznis et al. |
| 2007/0055392 | A1 | 3/2007 | Javier et al. |
| 2011/0022193 | A1 | 1/2011 | Panaitescu |
| 2011/0106049 | A1 | 5/2011 | Damiano et al. |
| 2012/0023061 | A1 | 1/2012 | Stephenson et al. |
| 2013/0054500 | A1* | 2/2013 | Al-Duwaish ........ G05B 13/027 706/19 |

OTHER PUBLICATIONS

Blanchini, Ultimate Boundedness Control for Uncertain Discrete-Time Systems via Set Induced Lyapunov Functions, Feb. 1994, IEEE Transactions on Automatic Control, 39(2): 428-433. Retrieved from http://ieeexplore.ieee.org/abstract/document/272351/ on Nov. 15, 2016.*

Lazar, Infinity Norms as Lyapunov Functions for Model Predictive Control of Constrained PWA Systems, 2005, Springer-Verlag Berlin Heidelberg, International Workshop on Hybrid Systems: Computation and Control (HSCC 2005) pp. 417-432 Retrieved from http://link.springer.com/chapter/10.1007/978-3-540-31954-2_27 on Nov. 15, 2016.*

Fialho et al, L1 State-Feedback Control With a Prescribed Rate of Exponential Convergence, Oct. 1997, IEEE Transactions on Automatic Control 42(10): 1476-1481. retrieved from: http://ieeexplore.ieee.org/document/633846/ on Nov. 15, 2016.*

Tse, et al., Wide-Sense Adaptive Dual Control for Nonlinear Stochastic Systems, Apr. 1973, IEEE Transactions on Automatic Control, vol. AC-18, pp. 98-108. retrieved from: http://ieeexplore.ieee.org/abstract/document/1100238/ Jul. 10, 2017.*

Chan, et al., A suboptimal dual controller for stochastic systems with unknown parameters, 1985, International Journal of Control, vol. 4, No. 2, pp. 507-524.*

Milito, et al., An Innovations Approach to Dual Control, Feb. 1982, IEEE Transactions on Automatic Control, vol. AC-27, No. 1, pp. 132-137. Retrieved from: http://ieeexplore.ieee.org/document/1102863/ Jul. 10, 2017.*

* cited by examiner

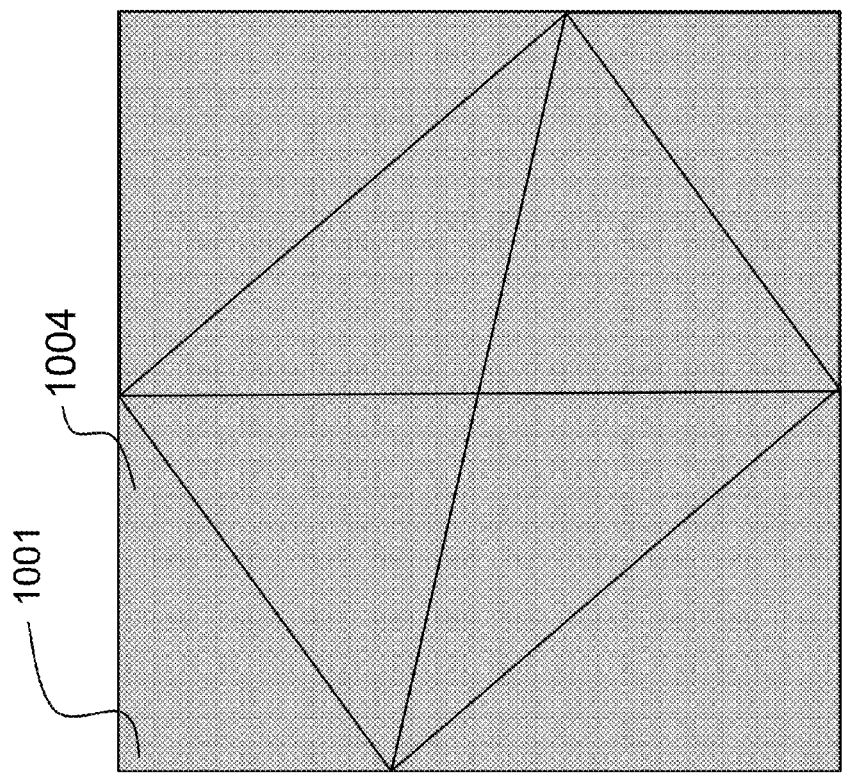
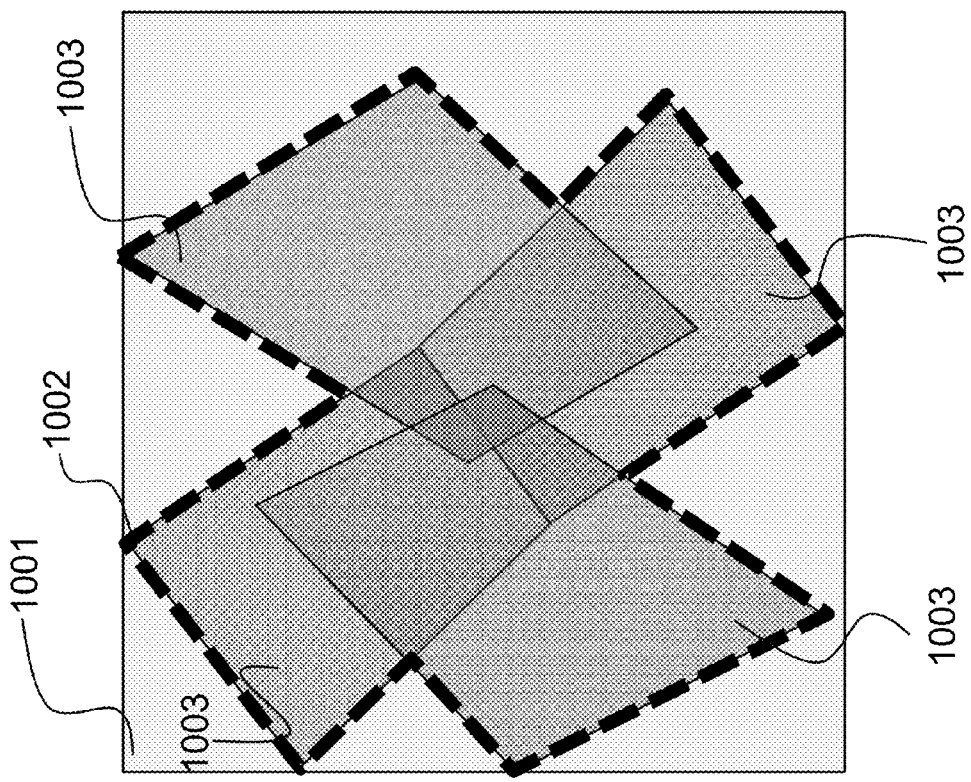
Fig. 10B
Fig. 10A

MODEL PREDICTIVE CONTROL WITH UNCERTAINTIES

FIELD OF THE INVENTION

This invention relates generally to controlling an operation of a machine, and more particularly to controlling the operation using a model predictive control (MPC) over a receding horizon.

BACKGROUND OF THE INVENTION

In machine control, a controller, which can be implemented using one or combination of software or hardware, generates commands values for input to a machine based on measurements obtained, e.g., from sensors and/or estimators, from outputs of the machine. The controller selects the input so that the machine operates as desired, for instance, the operation follows a desired reference profile, or regulates the outputs to a specific value. In several cases, the controller enforces constraints on the inputs and outputs of the machine, for instance, ensuring the corresponding variables are in some predetermined ranges to ensure safe machine operation from a physical, specification. In order to enforce such constraints, the controller often uses a model of the machine to predict what behavior the machine produce when a command, i.e., a control input, is applied. One example of a process in a controller that is capable of achieving control of a machine while enforcing constraints on the machine inputs and outputs is model predictive control (MPC).

The MPC is based on an iterative, finite horizon optimization of a model of a machine and has the ability to anticipate future events to take appropriate control actions. This is achieved by optimizing the operation of the machine over a future finite time-horizon subject to constraints, and only implementing the control over the current timeslot. For example, the constraints can represent physical limitation of the machine, safety limitations on the operation of the machine, and performance limitations on a trajectory. A control strategy for the machine is admissible when the motion generated by the machine for such a control strategy satisfies all the constraints. For example, at time t, the current state of the machine is sampled and an admissible cost minimizing control strategy is determined for a relatively short time horizon in the future. Specifically, an online or real-time calculation determines a cost-minimizing control strategy until time t+T. After the step of the control is implemented, the state is sampled again and the calculations are repeated starting from the now current state, yielding a new control and new predicted state path. The prediction horizon shifts forward, and for this reason MPC is also called receding horizon control.

The MPC can be used to generate the actual trajectory of the motion of the machine based on a model of the system and the desired reference trajectory by solving an optimal control problem over a finite future time subject to various physical and specification constraints of the system. The MPC aims for minimizing performance indices of the motion of the machine, such as an error between a reference and an actual motion of the machine, the machine energy consumption, and induced system vibration.

Because the MPC is a model-based framework, the performance of the MPC inevitably depends on the quality of the prediction model used in the optimal control computation. However, in most cases, the model for the machine dynamics is unknown a priori, as some parameters are not measured precisely. Thus, the controller may need to estimate unknown parameters of the model of the machine, during already operation of the machine, and thus, also enforce constraints while the parameters are estimated. The conventional approaches to handle such problems include adaptive or learning-based MPC, where an MPC control problem is augmented with a closed-loop identification scheme in order to learn the unknown machine parameters. By learning the unknown parameters, the operation of the machine achieved by the controller is improved.

However, current approaches of adaptive and learning based MPC are limited for multiple reasons. First, while estimating the unknown parameters, constraints can be violated or the control performance may be excessively reduced in order to conservatively enforce the constraints. In fact, several existing methods, such as a method described in U.S. 2011/0022193, simply ignore the constraints and thus are incapable of producing admissible control strategies for machines subject to constraints.

Second, simply including a closed-loop identification method in the MPC controller can generate a slow convergence of the estimated unknown parameters to the desired values. This reflects the general problem in adaptive control, as the controller limits the excitation of the machine while the identification requires strong excitation of the machine to estimate the parameters. Also, conservative methods that enforce constraints with unknown parameters often avoid large excitation to prevent violating the constraints, thus obtaining an even slower convergence of the estimate. Finally, several methods for adaptive MPC require a significant amount of computation and can be executed only in expensive processors at a slow rate, enabling only machines with low response bandwidth to be controlled.

Accordingly, there is a need for a method for controlling an operation of a machine using the MPC that includes uncertainty, wherein the operation of the machine is subject to the constraints.

SUMMARY OF THE INVENTION

Some embodiments of the invention are based on the realization that it is possible to provide a model predictive control (MPC) method with enforcement of the constraints on the operation of a machine and fast convergence to a value of a parameter of a model of the machine by using constraints on values of control inputs that can be applied to each state of the machine while guaranteeing that the constraints on the operation on the machine are not violated for any admissible value of the parameters of the model. In some embodiments, the control strategy of the MPC is to jointly optimize a performance of the control and a rate of the estimation of the parameters.

Some embodiments are based on the realization that it is possible to enforce constraints on a family of models defined based on an admissible range for the uncertain values of the machine parameters. The family of models provides a set of feasible states. For example, a special subset of these feasible states can be designed such that, for all states in this subset, there is a feasible control input that maintains the states in that subset for all values of the unknown machine parameters within their known ranges.

It is further realized that is possible to control the system using MPC such that the optimized input maintains the state in the special subset. This guarantees that the system controlled by the MPC always satisfies all the constraints including the case when the parameters are uncertain.

It is an additional realization that among the inputs that maintain the state in the special subset, an input that optimizes the trade-off between control and identification performance could be chosen. By construction, this input also guarantees constraint satisfaction regardless of the true values of the unknown parameters.

It is also realized that the MPC prediction model and the trade-off between control and identification can be updated online based on the identification of the unknown parameters and that the tradeoff between the control and identification performance can be adjusted based on the residual uncertainty.

Accordingly, one embodiment of the invention discloses a method for controlling an operation of a machine according to a model of the machine. The method includes controlling iteratively the operation of the machine with control inputs determined using the model based on an optimization of a cost function subject to constraints on the control inputs, wherein at least one current iteration comprises: determining a current state of the machine after the controlling with a previous control input determined for a previous iteration by optimizing a previous cost function using a previous model of the machine; determining a current model of the machine to reduce a difference between the current state and a state estimated using the previous model of the machine; updating the cost function based on a difference between the previous model and the current model to produce a current cost function; and determining a current control input for the controlling at the current iteration using the current model and the current cost function, wherein steps of the methods are performed by a processor of a controller controlling the operation of the machine.

Another embodiment discloses a method for controlling an operation of a machine according to a model of the machine including a nominal model defining relationships among parameters of the model and an uncertainty model defining a range of values for at least one parameter of the model. The method includes controlling iteratively the operation of the machine with control inputs determined using the model of the machine based on an optimization of a cost function, wherein the optimization is subject to control-invariant constraints on the control inputs selected such that any value of the control input satisfying the control-invariant constraints maintains a state of the machine in a control-invariant subset of states satisfying constraints on the operation of the machine, wherein for any state of the machine within the control-invariant subset there is an admissible control input satisfying the control-invariant constraints and maintaining the state of the machine within the control-invariant subset for all values of the parameters of the model within the range defined by the uncertainty model, wherein at least one current iteration comprises: determining a current state of the machine resulted from the controlling with a previous control input determined for a previous iteration by optimizing a previous cost function using a previous model of the machine; determining a current model of the machine to reduce a difference between the measured current state and a state estimated using the previous model of the machine, such that a current value of the parameter of the current model is within the range of values; updating the cost function based on a difference between the previous and the current models, wherein the cost function includes a first term for determining a first value for the control input according to an objective of the operation and includes a second term for determining a second value for the control input for reducing the difference between the current state of the machine and a state estimated with a model of the machine, such that the optimization optimizes a combination of the first term and the second term, wherein the updating the cost function includes changing a weight of the second term in the combination; and determining a current control input for the controlling at the current iteration using the current model and the current cost function, wherein steps of the methods are performed by a processor of a controller controlling the operation of the machine.

Yet another embodiment discloses a control system for controlling iteratively an operation of a machine according to a model of the machine. The system includes a memory storing the model of the machine including a nominal model defining relationships among parameters of the model and an uncertainty model defining a range of values for at least one parameter of the model, and the constraints on the machine; and at least one processor for executing modules of the controller comprising: a control input module for determining a current control input for the controlling during a current iteration by optimizing a current cost function subject to constraints on the current control input using a current model of the machine; a model learning module for determining the current model of the machine, such that a current value of the parameter of the current model is with the range of values and reduces a difference between a current state of the machine resulted from the controlling with a previous control input determined for a previous iteration by optimizing a previous cost function using a previous model of the machine and an estimated state estimated using the previous model of the machine; and a cost function module updating the previous cost function using a difference between the current state of the machine and the state of the machine estimated using the current machine model from a previous machine state and a previous machine control input.

BRIEF DESCRIPTION OF THE DRAWINGS

FIGS. 10A and 10B are schematics of the test for determining valid and non-valid control invariant Lyapunov function.

DETAILED DESCRIPTION OF THE PREFERRED EMBODIMENT

Figure 1A:
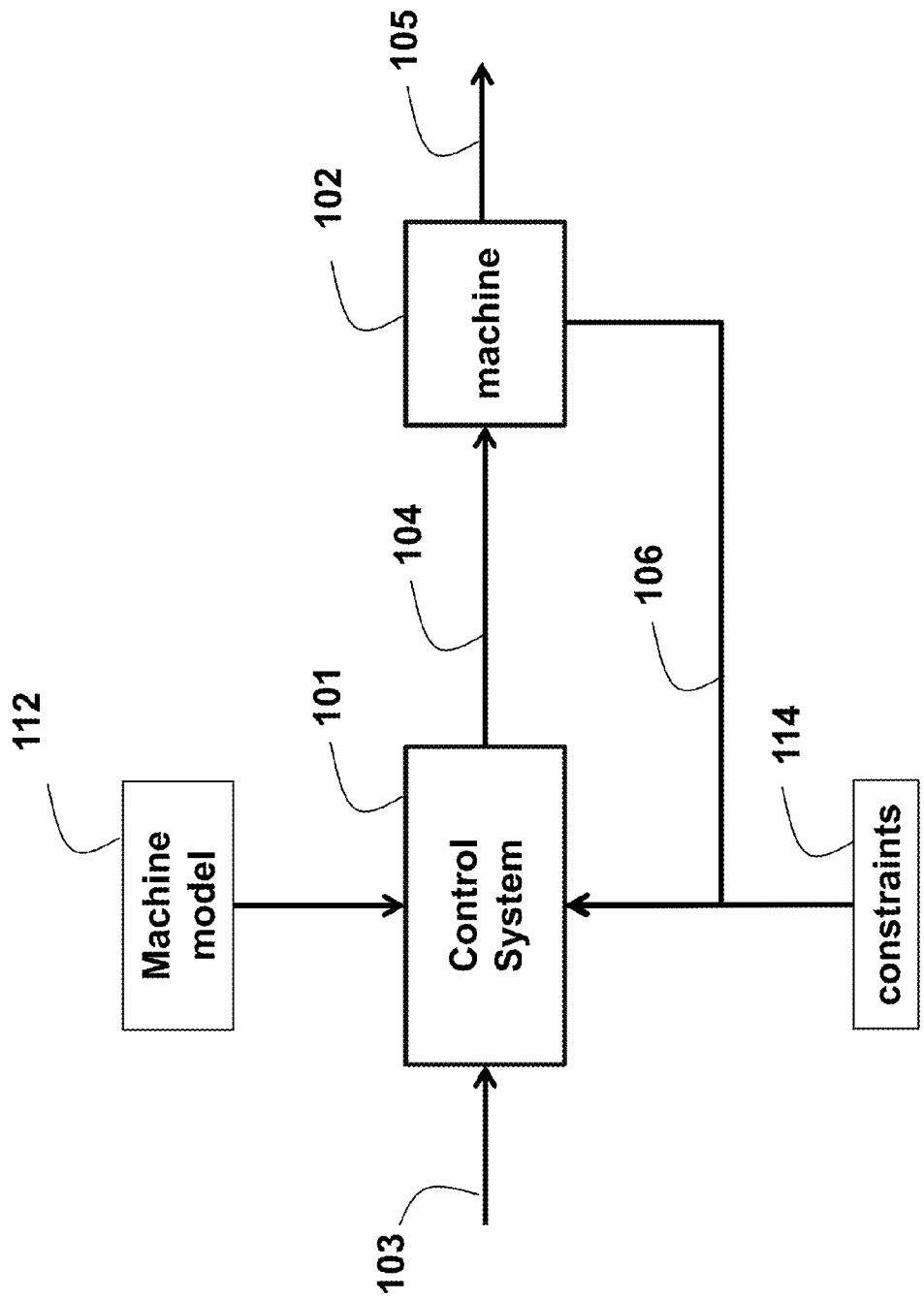
FIG. 1A is a block diagram of a controller for controlling an operation of a machine according to one embodiment of the invention.

FIG. 1A shows a block diagram of a control system 101 for controlling an operation of a machine 102. The machine 102 is a device whose operation changes quantities such as positions, velocities, currents, temperatures, numerical values, in response to commands. As used herein, the operation of the machine determines a motion of the machine that changes such quantities. The control system receives a desired motion 103 for the machine, such as a desired trajectory or target point for some of the quantities, and controls the machine via control inputs 104. The control inputs can include commands to change parameters of the operation of the machine or can include actual values of the parameters such as voltages, pressures, torques, forces that affect the machine motion resulting in the generation of quantities 105 for the machine.

The control system 101 receives information 106 about the machine motion, from sensors, hardware, or software connected directly or remotely to the machine. The information 106 includes a state of the machine. The machine uses the state for the selection of the control inputs 104. The information 106 can include some or all of the motion quantities 105 and can also include additional information about the machine. The quantities 105, the control inputs 104 or a combination thereof, can be requested to remain in some pre-defined ranges according to constraints 114 on the operation of the machine.

Figure 1B:
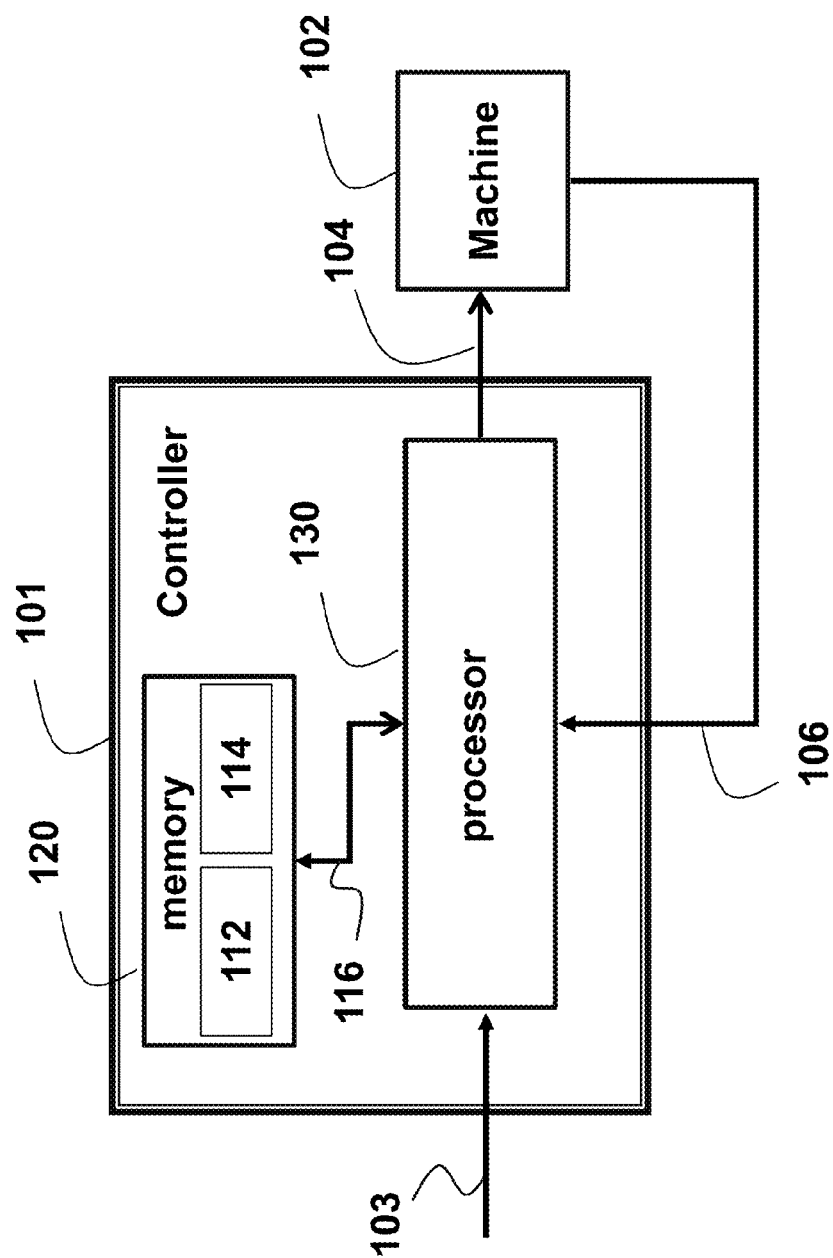
FIG. 1B is a block diagram of a general structure of the controller of FIG. 1A according to one embodiment of the invention.

FIG. 1B shows a general structure of the control system 101 according one embodiment of the invention. The control system 101 includes at least one processor 130 for executing modules of the controller. The processor 130 is operatively connected to a memory 120 for storing the model 112 and the constraints 114. It is an objective of some embodiments of the invention to determine the control inputs 104 using a model of the machine 112 subject to the constraints 114. It is another objective of some embodiments to update 116 the model of the machine during the operation such that the constraints 114 are satisfied during the update.

Figure 2A:
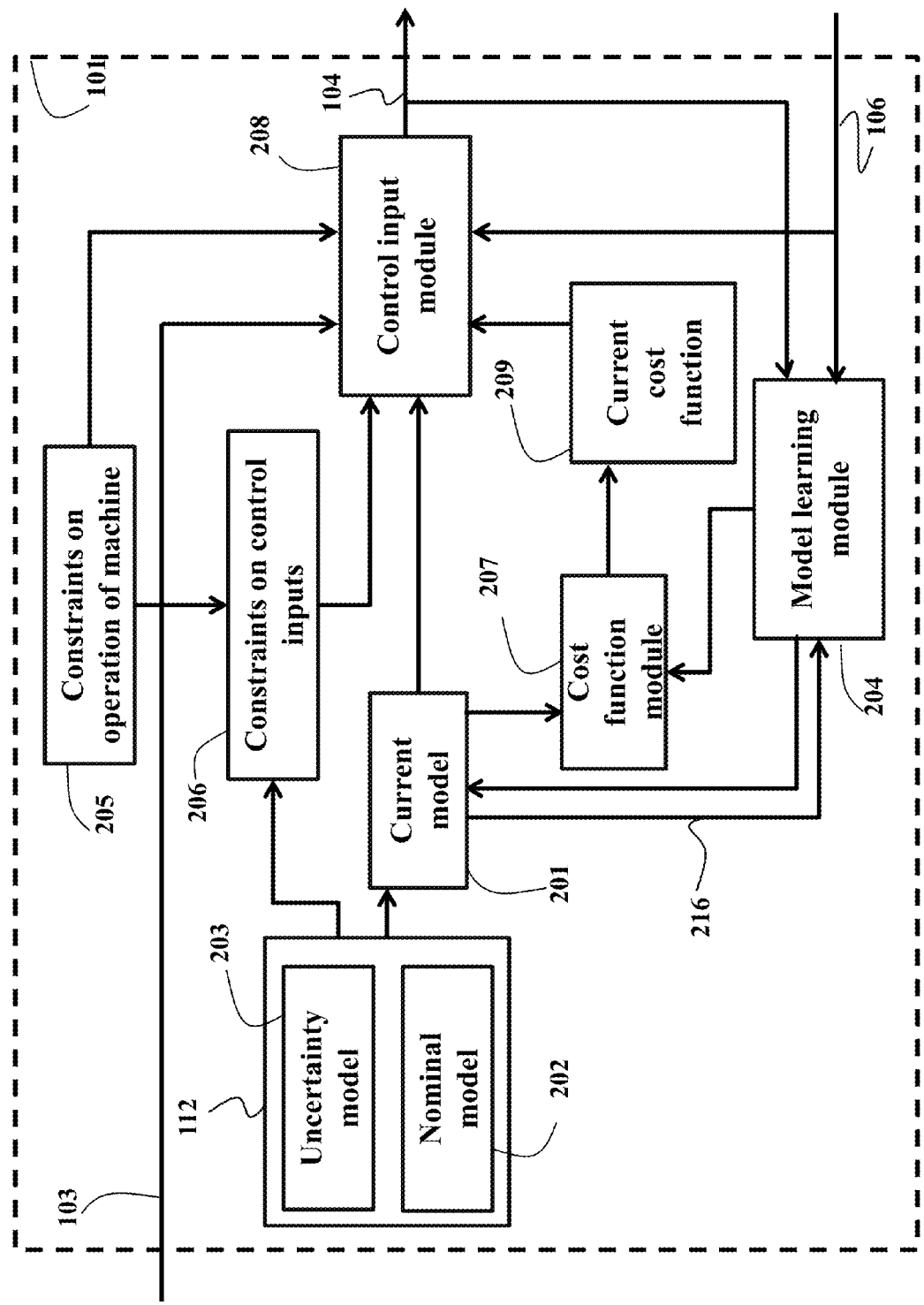
FIG. 2A is a block diagram of various modules of the controller according to one embodiment of the invention.

FIG. 2A shows a block diagram of various modules of the control system 101 according to one embodiment of the invention. In some embodiments of the invention, MPC or the model of the machine includes at least one parameter of uncertainty. For example, a model of an arm of a robot can include an uncertainty about a mass of the arm caring an object. A model for the movement of a train can include an uncertainty about a friction of the wheels with the rails in current weather conditions. In some embodiments, the control system 101 is used to determine the uncertainties of the control.

In some embodiments, the model of the machine includes a nominal model 202 defining relationships among parameters of the model 112 and an uncertainty model 203 defining a range of values for at least one parameter of the model 112 and/or the nominal model 202. For example, the parameters of the nominal model can use default values of the parameters. For example, the nominal model 202 can describes the motion of the machine in ideal conditions. However, the machine is subject to external effects, such as wear, external actions, variations due to time and weather, inexactly known physical quantities due to imperfections in the manufacturing process or measurement errors and hence the actual motion of the machine is not exactly the same as the one of the nominal model. For example, one embodiment, starting from a nominal model, update the current model iteratively until the current model is in line with the observed machine motion, in terms of the sequence of the machine state values.

Some of the machine quantities need to remain in desired ranges defined by constraints 205 on the operation of the machine. Some embodiments of the invention are based on the additional realization that constraints 206 on the control inputs can be determined from constrains 205 on the operation of the machine considering the uncertainty model 203. For example, the constraints 206 on the control inputs are determines such that the machine 102 controlled by the control inputs 104 satisfying the constraints 206 are guaranteed to satisfy the constraints 206 for all variations of the values of the parameters of the model within the admissible range defined by the uncertainty model 203.

In some embodiments, the constraints 206 are determined offline and the constraint 205 are not used for the controlling of the machine. In some embodiments, the constraints 206 are used in combination with at least some constraints 205 for controlling the machine.

In some embodiments, the control inputs 104 are determined based on an optimization of a cost function 209 subject to constraints 206 on the control inputs. Because the constraints 206 guaranties the feasibility of the control, some embodiment include different terms in the cost function for a trade-off between the control to achieve the objective of the operation of the machine and the control to increase a rate of reducing the uncertainties of the parameters of the model of the machine.

For example, the cost function can include a first term for determining a first value for the control input according to an objective of the operation and includes a second term for determining a second value for the control input for reducing the difference between the current state of the machine and a state estimated with the model of the machine and the machine model, such that the optimization optimizes a combination of the first term and the second term, wherein the updating the cost function includes changing a weight of the second term in the combination.

Accordingly, in some embodiments, various modules of the control system 101 achieve the control of the machine satisfying the objectives of the operation of the machine while updating the parameters of the model of the machine within the range of values define by the nominal model and the uncertainty model of the machine using the optimization of the cost function including different terms for different objectives of the control.

The control system includes a memory 120 for storing the model of the machine and the processor 130 for executing modules of the controller. The modules include a control input module 208 for determining a current control input 104 for the controlling during a current iteration by optimizing a current cost function 209. The control input module optimizes the current cost function using a current model 201 of the machine subject to constraints 206 on the current control input.

The control system also includes a model learning module 204 for determining the current model 201 of the machine, such that a current value of the parameter of the current model is with the range of values defined by the nominal model 202 and the uncertainty model 203 and reduces a difference between a current state 106 of the machine resulted from the controlling with a previous control input determined for a previous iteration by optimizing a previous cost function using a previous model of the machine and an estimated state 216 estimated using the previous model of the machine.

The controller also includes a cost function module 207 for determining the current cost function 209. For example, the cost function module updates the previous cost function using a difference between the previous model and the current model to produce the current cost function. Because the steps of the control are performed iteratively, the current model and the current cost unction become previous model and previous cost function for subsequent iteration. For example, the previous model, the previous cost function and the previous control input are determined at a previous iteration as the current model, the current cost function and the current control input.

Figure 2B:
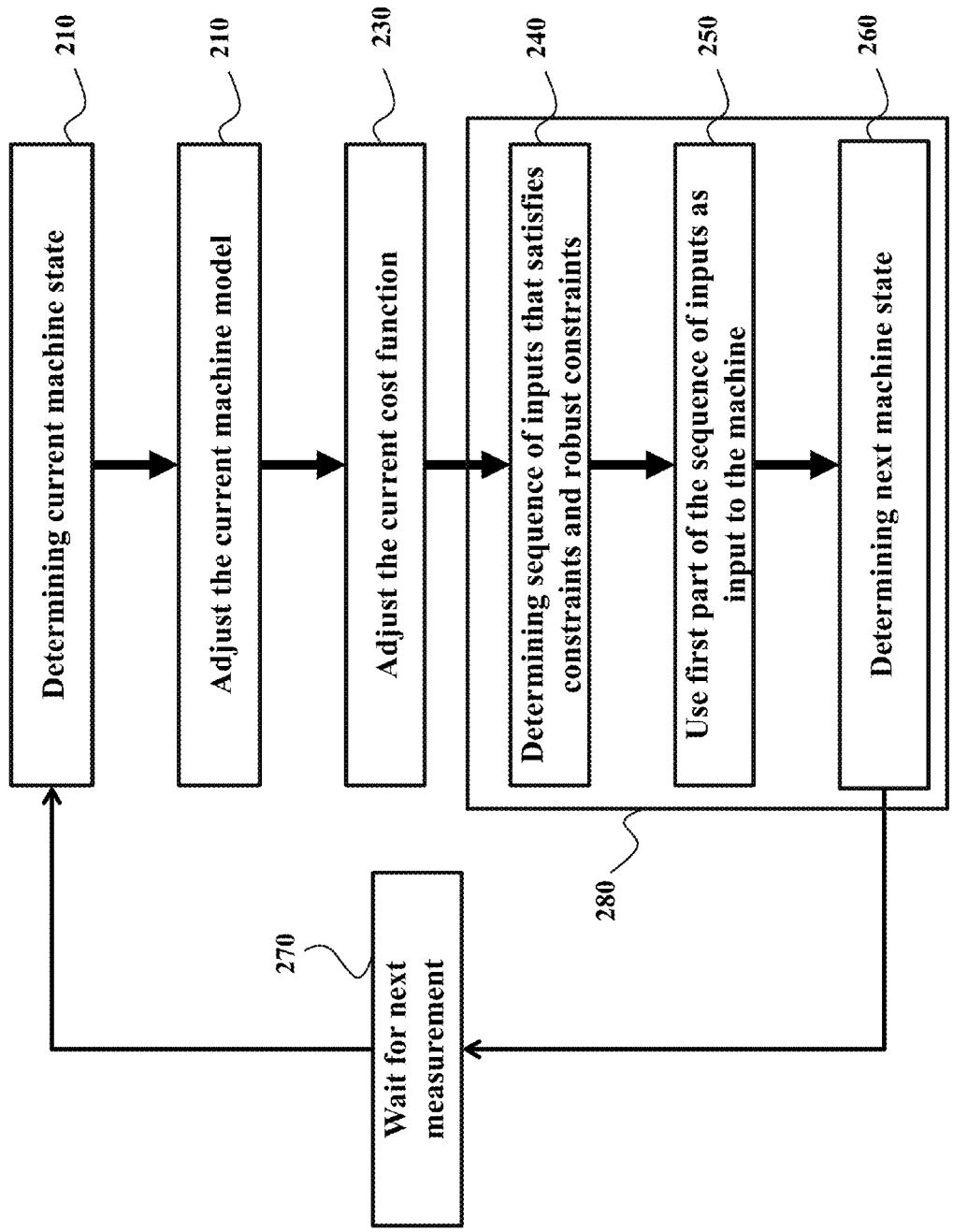
FIG. 2B is a block diagram of a method executed by the modules of the controller according to one embodiment of the invention.

FIG. 2B shows a block diagram of a method executed by the modules of the control system 101. The method controls iteratively 207 the operation of the machine with control inputs determined using the model of the machine based on an optimization of a cost function. The method determines 210 a current state of the machine resulted from the controlling with a previous control input determined for a previous iteration by optimizing a previous cost function using a previous model of the machine.

The method determines 220 a current model of the machine to reduce a difference between the measured current state and a state estimated using the previous model of the machine, such that a current value of the parameter of the current model is with the range of values, and updates 230 the cost function based on a difference between the previous and the current models. The update 230 provides a trade-off between the control to achieve the objective of the operation of the machine and the control to increase a rate of reducing the uncertainties of the parameters of the model of the machine.

In some embodiments, the cost function includes a first term for determining a first value for the control input according to an objective of the operation and includes a second term for determining a second value for the control input for reducing the difference between the current state of the machine and a state estimated with the model of the machine and the machine model, such that the optimization optimizes a combination of the first term and the second term. In those embodiments, the cost function is updated by changing a weight of the second term in the combination. For example, a smaller difference between the previous and the current models reduces the wait of the second term in the combination.

Next, the method determines 280 a current control input for the controlling at the current iteration using the current model and the current cost function. For example, the method uses the updated current cost function and current machine model to determine 240 a sequence of future inputs, from current time instant for a fixed amount of time in the future, long at least as the to obtain a new machine state measurement, such that the predicted future machine states and inputs satisfies the constraints on the control inputs. The first part of the input sequence, for duration equal to the amount of time needed to obtain a new measurement of the state of the machine, is applied 250 as current control input to the machine. Based on the current state of the machine, current model of the machine, and current control input to the machine, the next state of the machine is determined 260, and the controller waits 270 until a new state measurement is received.

Uncertainty Modeling

Some embodiments of the invention are based on the realization that even if the true values of the parameters of the models are uncertain, the uncertainties of the parameters of the model are within the known range. For example, the mass of the train can be within a range of values for an empty train and fully loaded train. Similarly, the disturbances on the values of the parameters of the model can be bounded. The uncertainty model 203 represents the rages for the possible values of at least one parameter of the model, such that a combination of the nominal model and the uncertainty model can be used to determine a current model of the machine for the MPC.

Figure 3A:
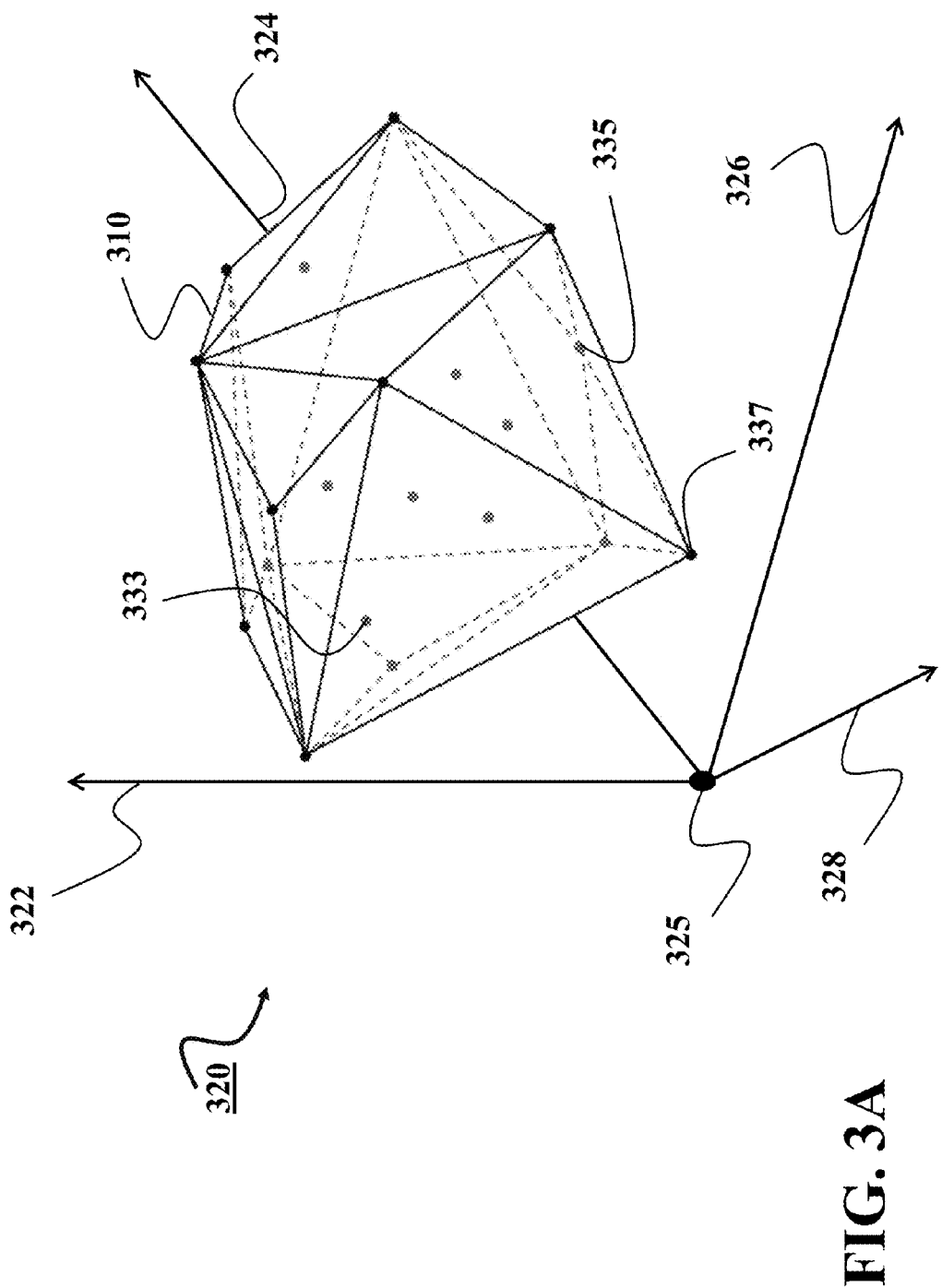
FIG. 3A is a schematic of an exemplar polytope arranged in the coordinate system visualizing the principles of some embodiments of the invention.

FIG. 3A shows an exemplar polytope 310 arranged in a coordinate system 320 visualizing the principles of the above realization. The coordinate system 320 is usually a low-dimensional system of parameters of the model having the uncertainties. For example, if the model includes four parameters with uncertainties, the coordinate system 320 is four dimensional and have one dimension 322, 324, 326, and 328 for each of the parameters such that new values of the combination of parameters, e.g., values 333, 335, 337 are selected within the polytope 310.

For example, a function that describes the motion of the machine at equally time-spaced sampling instants by a system of difference equations for a given machine state, input, and disturbance d, which represents the combined effects of uncertainties is $$x(k+1)=f(x(k),u(k),d(k))$$

$$y(k)=Cx(k), \quad (1)$$

where k is the index of the sampling instant, f is a generic function, C is a matrix, x is the machine state 106, u is the machine input 104 and y is the machine output 105. It is realized that in the number of situations the disturbances are bounded within the range D, the states are bounded within the range $\mathcal{X}$, and the control inputs are bounded within the range U $$x \in \mathcal{X}, u \in \mathcal{U}, d \in D. \quad (2)$$

For instance the range of values D can be determined by the minimum and maximum value of the machine mass, the minimum and maximum value of the external forces. Similarly, the ranges of the inputs and states can be determined by minimum and maximum values of velocities, positions, voltages, or torques.

Some embodiments, based on f and D, construct a set of matrices, an additive linear disturbance matrix and a polyhedral set for additive disturbance $$\{(A_i,B_i)\}_{i=1}^l, B_w, \mathcal{W} \quad (3)$$

respectively, that results in the polytopic difference inclusion $$co\{A_i x+B_i u\}_{i=1}^l \oplus co\{B_w w_i\}_{i=1}^n, \quad (4)$$

such that for any given x and u, $$co\{A_i x+B_i u\}_{i=1}^l \oplus co\{B_w w_i\}_{i=1}^n \supseteq f(x,u,d), \forall d \in D, \quad (5)$$

where $\mathcal{X} = \text{co}\{w_i\}_{i=1}^n$, so that $w_i$ are the vertices of W and "co" indicates the convex hull of the set.

The linear models in Equation (4) can be determined, for instance, by taking the maximum and minimum of the parameters that form vector d allowed by D, and/or of their combinations.

Figure 3B:
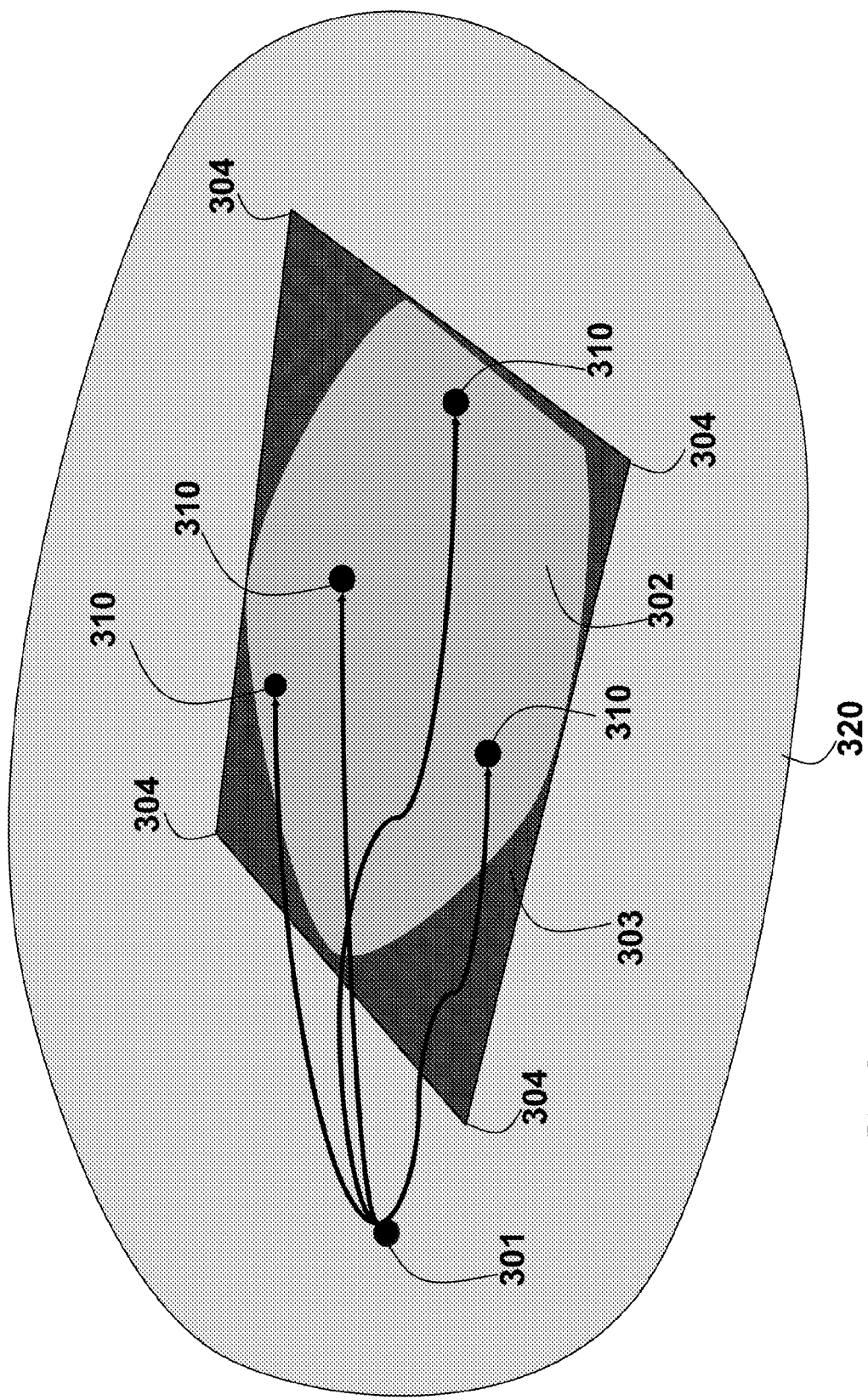
FIG. 3B is a schematic of effect of the uncertainties of the parameters of the model on a state of the machine.

FIG. 3B shows a schematic of effect of the uncertainties of the parameters of the model determined by Equation (4) in estimating the state of the machine. Given the current state x 301 of the machine and a control input, the next state of the machine can vary within a set 302 for different possible values of d of the parameters of the model of the machine. For instance, depending on specific values of the vector d, the state 302 can be transition to different states 310 within the set 302 for the same value of the control input.

In some embodiments of the invention, the uncertainty model is extended such that a combination of the nominal model and the uncertainty model is included into a convex combination 303 of linear models with a convex combination of additive disturbances. For example, when W=0, the model of Equation (4) over-approximates the set 302 by set 303 which is a bounded polyhedron, or polytope, where the vertices 304 are determined from $$v_i = A_i x + B_i u, i=1 \ldots l, \quad (6)$$

wherein l, $(A_i, B_i)$, i=1, . . . , l are the number and the matrices, respectively, defined in Equation (3). In embodiments with W≠0, the set 303 is the sum of the set obtained from the convex hull of and the set $\text{co}\{B_w w_i\}_{i=1}^n$.

Based on Equation (4) an input u in the range $\mathcal{U}$ that satisfies all $$A_i x + B_i u + B_w w_j \in \mathcal{X}, i=1 \ldots l, j=1 \ldots \eta \quad (7)$$

makes the set 303 entirely in the range of admissible states, 320, and hence also the possible next state of the machine 302 according to (1) is within 320. Thus, enforcing constraints on Equation (4) guarantees enforcement of the constraints on Equation (1). The embodiments that use the model determined by Equation (4) are computationally advantageous, because the model determined by Equation (4) includes a set of linear models, rather than uncertain nonlinear models described in Equation (1).

Constraints on Control Inputs to the Machine

Some embodiments of the invention are based on realization that in order to guarantee that the constraints on the machine motion are satisfied during the operation of the machine for all variation of the values of the parameters of the model within the predetermined range, a subset of the feasible region $\mathcal{X}$ of the states can be determined, such that whenever the state of the machine is in such a subset, there exists at least one admissible control input such that the state remains in the subset for all possible values of the parameters and the disturbances. By remaining in the subset, all the machine motion constraints are satisfied since the subset is included in the feasible region $\mathcal{X}$.

Some embodiments of the invention determines and use such constraints on the control inputs, referred herein as control-invariant constraints on the control inputs, to determine a control input that maintains the state of the machine in such a subset of the feasible region $\mathcal{X}$ of the states, referred herein as a control-invariant subset of states. By the construction, a control input satisfying the control-invariant constraints maintains a state of the machine in a control-invariant subset of states satisfying constraints on the operation of the machine for all values of the parameter of the model within the range defined by the uncertainty model.

Figure 4A:
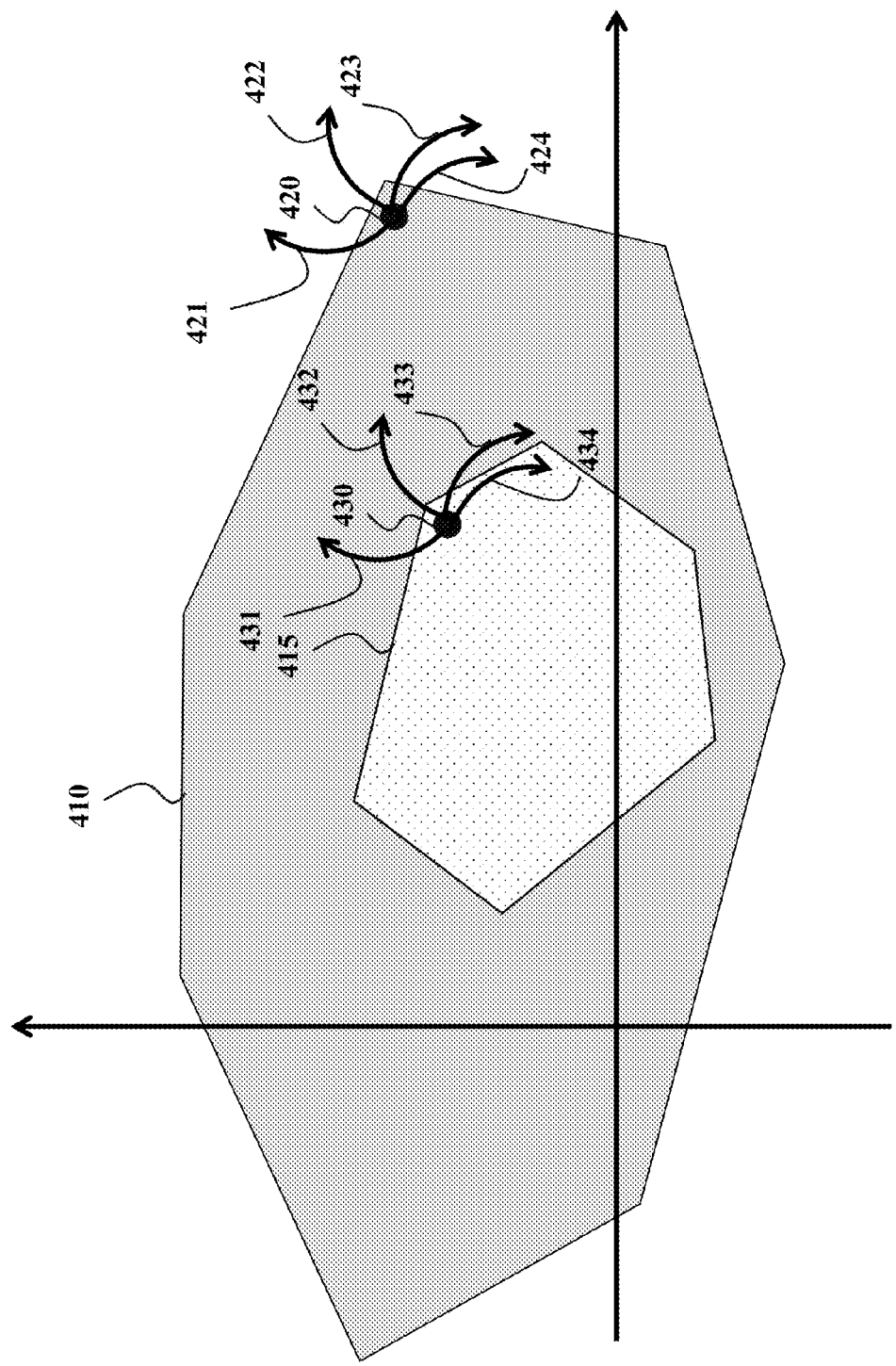
FIG. 4A is a schematic of an example of a two-dimensional projection of the control-invariant subset of states defined by various constraints on the operation of the machine according to some embodiments of the invention.

FIG. 4A shows an example of a two-dimensional projection of the control-invariant subset of states 410 defined by various constraints on the operation of the machine according to embodiments of the invention. Typically, the feasible region is a multi-dimensional polytope determined by hyperplanes, which are represented by linear inequalities, along multiple dimensions corresponding to the constraints on the operation.

Due to the nature of receding horizon control, the existence of a solution for a certain horizon does not by itself guarantees the existence of the solution for a subsequent horizon. For example, the state of the machine and a state of the reference trajectory 420 can be optimal and feasible for one iteration, but all control actions 421-424 that controller is allowed to take during the next iteration can bring a state of the machine outside of the feasible region 410.

Some embodiments of the invention are based on yet another realization that it is possible to select a control-invariant subset 415 of the feasible region, such that from any state of the machine within that control-invariant subset, there is a control input maintaining the state of the machine within the subset for the known future states of the reference trajectory or for all admissible future states of the reference trajectory. For example, for any state such as a state 430 within the subset 415 and within all possible control inputs 431-434 that the controller can execute, there is at least one control input 434 that maintains the state of the machine and reference within the subset 415. In this case, the subset 415 is a control invariant subset.

Some embodiments determine the control invariant subset of state for the model of Equation (4), such that for each state within the control invariant subset there is at least one control action maintaining the state of the machine within the control invariant subset for all possible states values according to Equation (5).

Figure 4B:
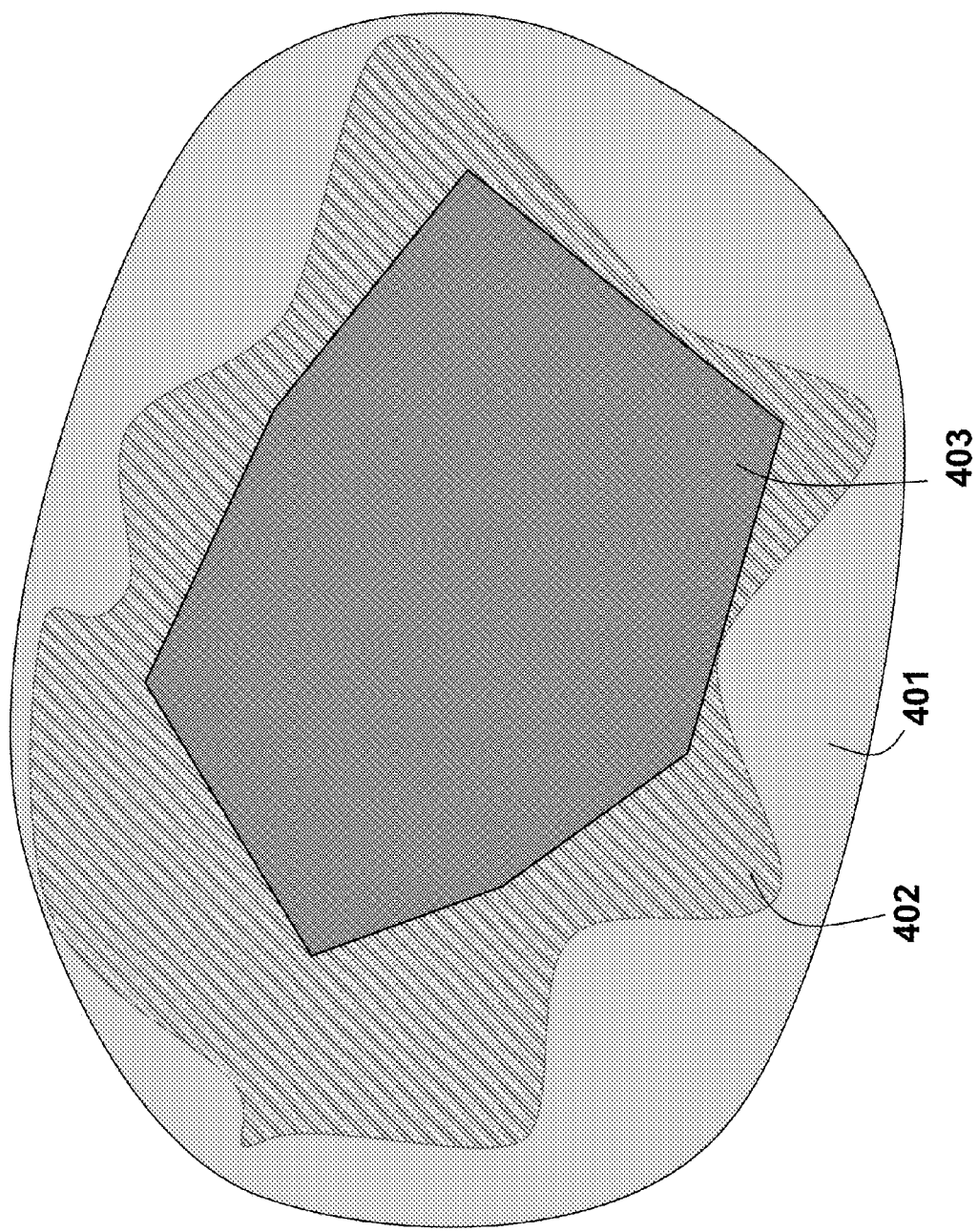
FIG. 4B is a schematic showing the relation between the feasible region of the states of the machine and control invariant subsets determined according to some embodiments of the invention.

FIG. 4B shows the relation between the feasible region 401 of the states of the machine, the largest robust control invariant subset 402 of the state for the model with uncertainties according to Equation (1) within $\mathcal{X}$. In some embodiments the control invariant subset 402 is reduced to form control invariant 403, which is less than the subset 402, but has a simpler shape formed by linear equations. Because the subset 402 is determined by nonlinear equations, the shape of the subset 402 can be non-convex. Thus, computation of 403 is simpler, more efficient and advantageous for control purposes.

Figure 5:
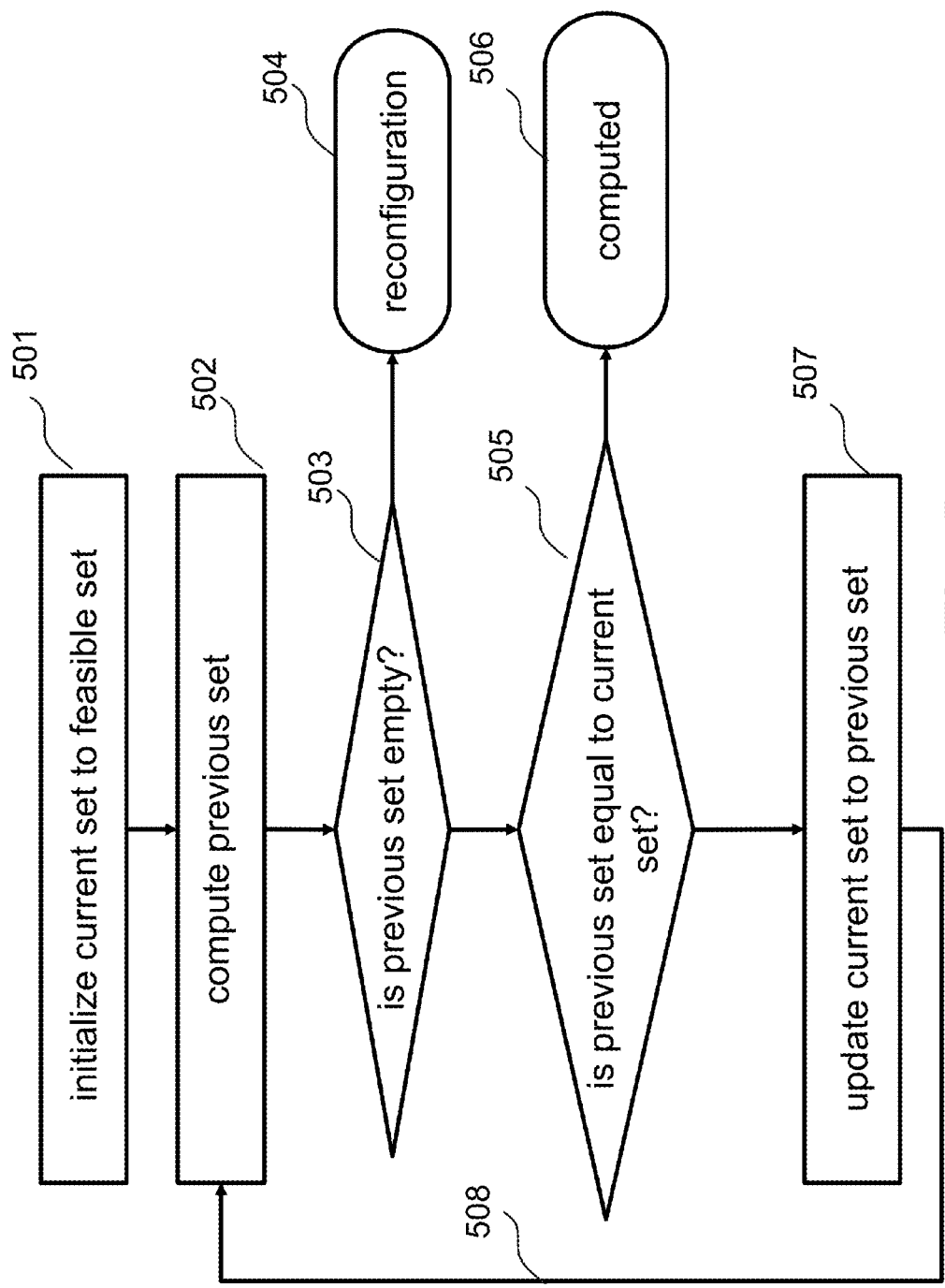
FIG. 5 is a block diagram of a backward-reachable region computation for determining the control invariant subset according to one embodiment of the invention.

FIG. 5 shows a block diagram of a backward-reachable region computation for determining the robust control invariant subset 403 starting from the feasible region $\mathcal{X}$, 401 according to one embodiment of the invention. The backward-reachable region computation determines the robust control invariant subset $C_x$ and also the control invariant set $C_u(x)$, which determines for any x within $C_x$ the set of inputs u in $\mathcal{U}$ that can be applied so that all possible next states according to (4) are inside $C_x$.

The backward-reachable region computation initializes 501 a current set $\mathcal{X}_c$ to the feasible set $\mathcal{X}$ and determines 502 a previous set of states $\mathcal{X}_p$ as a subset of the current set $\mathcal{X}_c$ such that for all states x in $\mathcal{X}_p$ there exists an input u in $\mathcal{U}$ such that for all the possible values of the parameters p in P, the updated state is in the current set $\mathcal{X}_c$.

If 503 the previous set $\mathcal{X}_p$ is empty 504, correct operation of the controller cannot be guaranteed, which means that the set P of possible values of the parameters should be reduced in size, possibly by changing the design or objective of the operation of the machine. If 505 the current set and the previous set are equal, that is also 506 the set $C_x$ otherwise, the previous set is assigned 507 to be the current set and the computation iterates 508 again. When the set $C_x$ is found the last computed set of state-input couples is the robust admissible input set $C_u(x)$ for all x within $C_x$.

Figure 6:
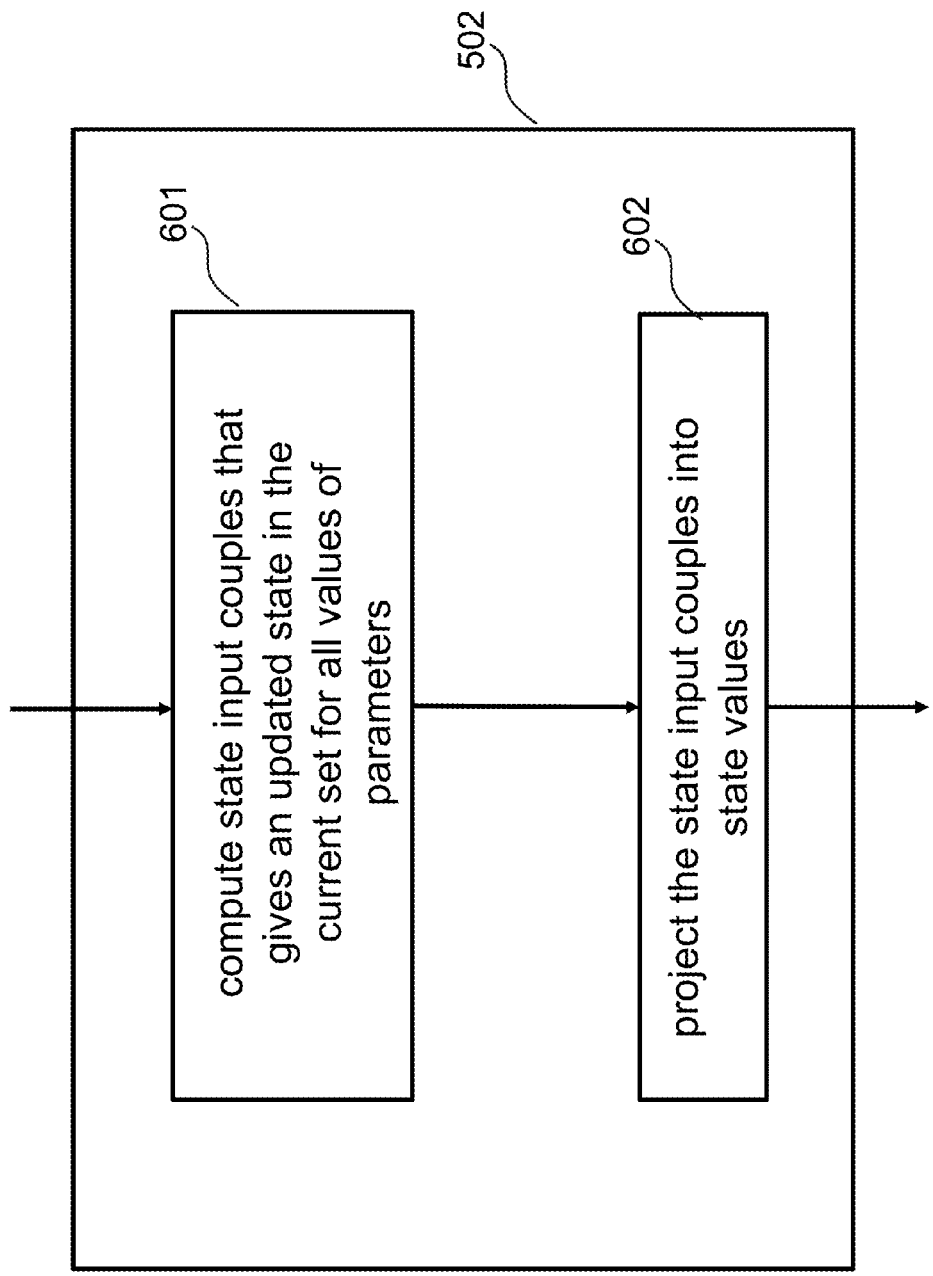
FIG. 6 is a block diagram of an exemplar implementation of determining the previous set of states according to one embodiment of the invention.

FIG. 6 shows a block diagram of an exemplar implementation of determining 502 the previous set of states according to one embodiment. The embodiment identifies 601 the state-input couple that generates an updated state that is in the current set for all the values of the parameters, and projects 602 the state input couples into state values, i.e., the embodiment identifies the states that belongs to at least one of such state-input couples.

Figure 7:
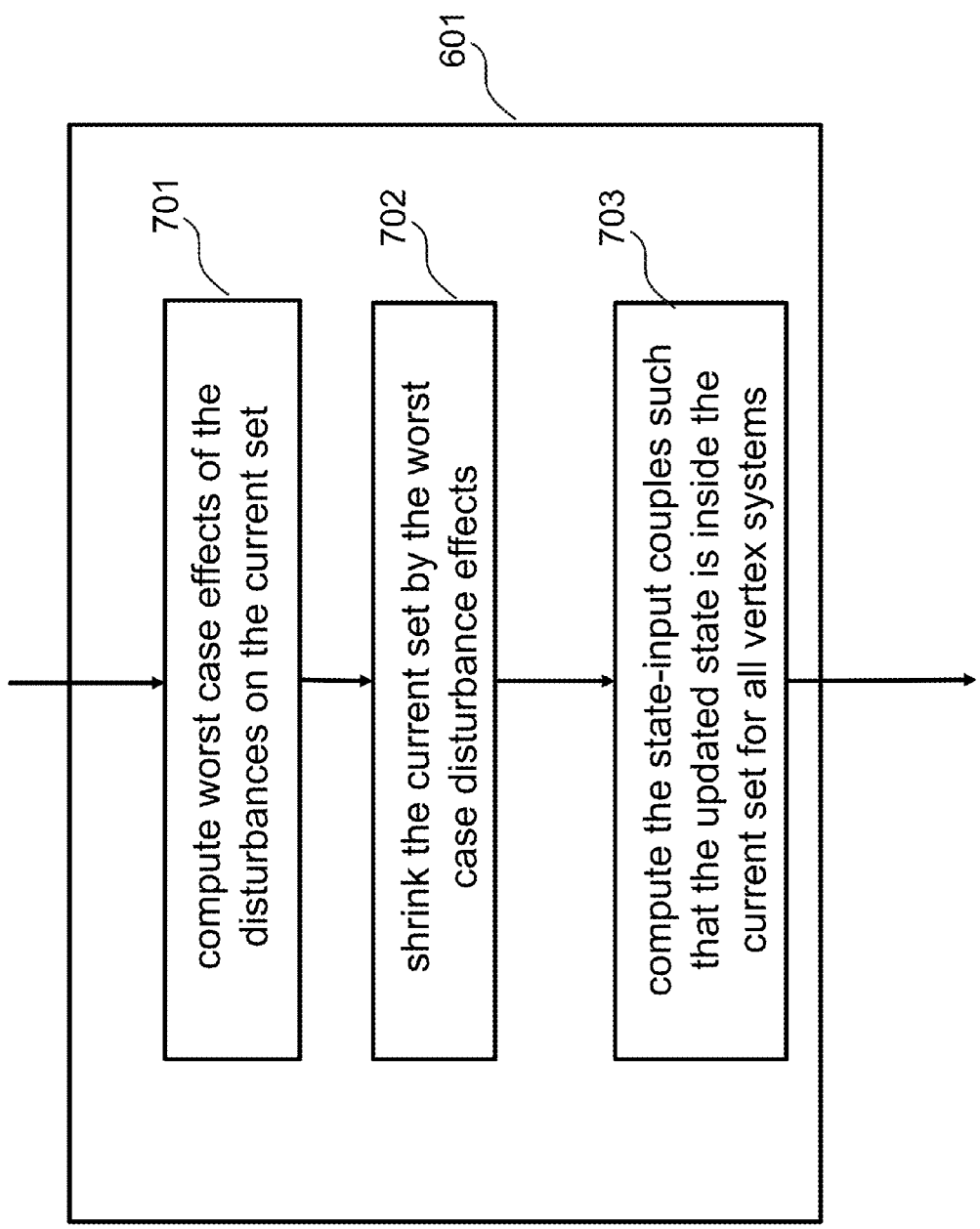
FIG. 7 is a block diagram of a method for determining the couples of states-inputs according to one embodiment of the invention.

FIG. 7 shows a block diagram of a method for computation of the couples of states-inputs 601 when linear inequalities describe the sets $\mathcal{X}$ and $\mathcal{U}$. The method considers the current set as $$H^{(c)}x \leq K^{(c)} \qquad (8)$$

and determines 701 the worst case effects of the additive disturbance w on the current set,
(i)

$$[S]_i = \max_{w \in \mathcal{W}}[H(c)B_w w]_i, \quad i=1, \ldots, n_q^{(c)} \qquad (9)$$

wherein $H^{(c)}$ is a matrix describing the current set defined in (8), $n_q^{(c)}$ is the number of rows of the matrix $H^{(c)}$ of the current set.

Next, the method reduces 702 the current set by the worst case disturbance effects to produce a reduced current set $\mathcal{X}_s$ described by $$H^{(c)}x \leq K^{(c)} - S_i, \qquad (10)$$

and then determines 703 the couples (x, u) such that the updated state is inside the current set for all the vertex systems in (18), i.e., $A_i x + B_i u \in \mathcal{X}_s$, $\forall_i = 1, \ldots, l$.

Stability Constraints

In some embodiments of the invention, the constraints on the control inputs include stability constraints for converging the state of the machine to a target value for all values of the parameters of the model of the machine defined by the nominal and the uncertainty models. In one embodiment, the stability constraints include a control Lyapunov function of the machine. For example, the control Lyapunov function (CLF) for the model of Equation (4) is a function $\mathcal{V}$ that satisfies the feasible value reduction $$\mathcal{V}_{(f(x,u))} \leq \rho \mathcal{V}(x), \qquad (11)$$

where f is the model of Equation (4), $\mathcal{V}$ is a function that is 0 at the desired target and positive everywhere else, $\rho$ is a value between 0 and 1.

In some embodiments the control Lyapunov function $\mathcal{V}$ is a control invariant. As defined herein, the valid invariant control Lyapunov function is such a control Lyapunov function that for all x inside the control invariant subset $C_x$, e.g., determined for the model of Equation (4), there exists the control input u inside $C_u(x)$, i.e., satisfying the control invariant constraints, such that Equation (11) is satisfied.

Figure 8:
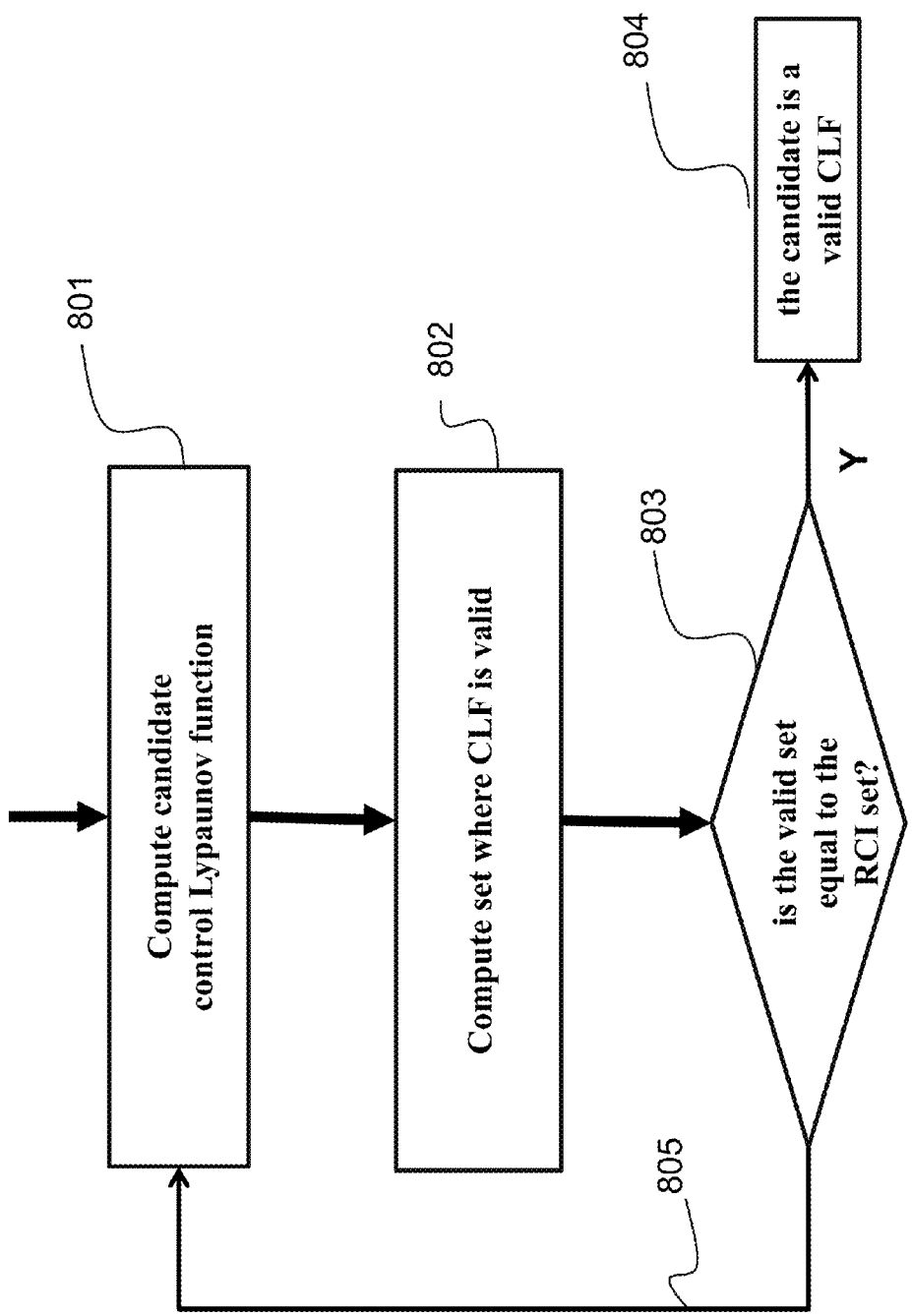
FIG. 8 is a block diagram of a method for determining a control invariant Lyapunov according to one embodiment of the invention.

FIG. 8 shows a method for determining the control invariant Lyapunov function for the control system according to one embodiment of the invention. The method generates 801 a candidate CLF, and determines the subset of states 802 of the candidate CLF as the subset of $C_x$ such that there exists a u inside $\mathcal{U}$ such that Equation (11) hold. Next, the method verifies 803 whether the subset 802 is equal to the subset $C_x$. If this is the case 804, the candidate CLF $\mathcal{V}$ is the control invariant Lyapunov function, otherwise 805 a different candidate CLF is generated.

Figure 9:
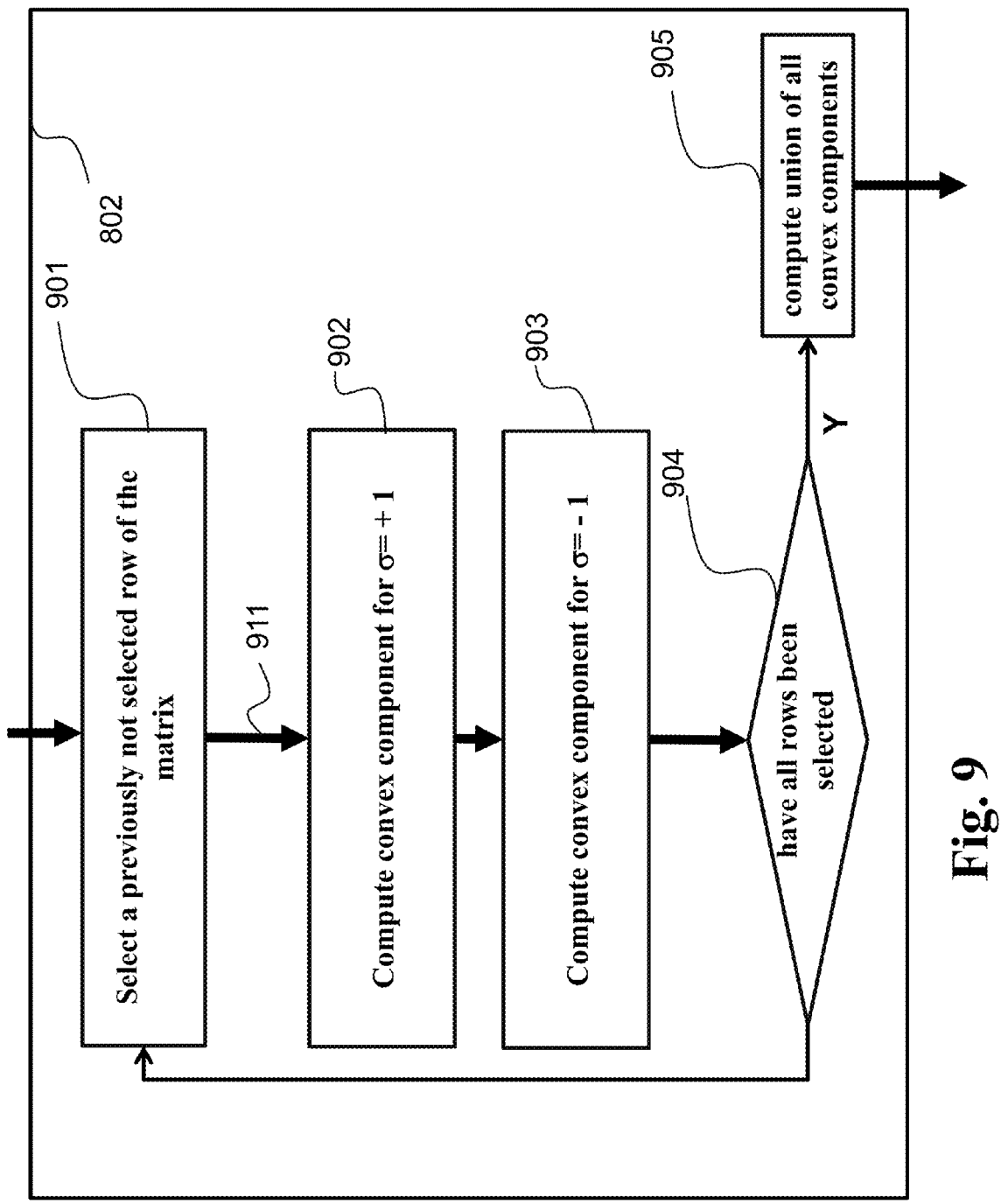
FIG. 9 is a block diagram of a method for determining the subset of states for a candidate Lyapunov function according to one embodiment of the invention.

FIG. 9 shows a block diagram of a method for determining the subset of states 802 for the candidate Lyapunov function according to one embodiment wherein $\mathcal{V}(x) = \|Px\|_\infty$ where P is a matrix describing an infinity-norm control Lyapunov function with $n_p$ rows. The embodiment selects 901 a previously not selected row 911 of the matrix P, and determines 902, the convex component of the subset related to the row 911 for positive condition $\sigma = +1$ by computing the set of x such that there exists u and $\varepsilon$ such that the inequalities $$\varepsilon \geq [P(A_i x + B_i u)]_j, \forall j = 1, \ldots, n_p, \forall i = 1, \ldots, \ell \qquad (12)$$
$$\varepsilon \geq -[P(A_i x + B_i u)]_j, \forall j = 1, \ldots, n_p, \forall i = 1, \ldots, \ell$$
$$\varepsilon \leq \rho[Px]_r$$
$$\sigma[Px]_r \geq [Px]_h, \forall h = 1, \ldots, n_p,$$
$$\sigma[Px]_r \geq -[Px]_h, \forall h = 1, \ldots, n_p,$$

holds true for $\sigma = +1$, where $n_p$ is the number of rows of the matrix P.

Next, the embodiment determines 903, for negative condition $\sigma = -1$, the convex component of the subset related to the row 911 and $-1$ is computed as the set of x such that there exists u and $\varepsilon$ such that (12) is satisfied with now $\sigma = -1$. When all the rows have been selected, the union of all the convex components form the subset 802.

FIGS. 10A and 10B show an illustration of the test for determining valid and non-valid control invariant Lyapunov function. The subset 1002 within the control invariant subset 1001 is valid where subset 1003 is a union of multiple convex components 1003 of the candidate CLF. In the FIG. 10A, the CLF is not control invariant because subsets 1002 and 1001 are different. In FIG. 10B, the CLF is control invariant, because a candidate CLF that has valid subset 1004, is valid for the subset 1001 since the subset 1004 covers the entire area of the subset 1001.

For example, in one embodiment of the invention, the control Lyapunov function is an infinity-norm control Lyapunov function that satisfies a feasible value reduction test for all states of the machine satisfying the control-invariant constraints. The test can include selecting rows of a matrix describing the infinity-norm control Lyapunov function and determining convex components of the states of the machine that satisfy, for positive and negative conditions, a feasible value reduction on the rows of the matrix describing the infinity-norm control Lyapunov function for at least one input of the machine satisfying the control-invariant constraints. Next, the embodiment determines a union of the convex components and verify that all the states of the machine in the the control-invariant subset of the states of the machine are contained in the union of the convex components.

Model Learning

In one embodiment, the current model of the machine 201 is initialized based on the nominal model 202 where a pair of estimated system matrices $(\hat{A}, \hat{B})$ is selected from the convex hull of the set of matrices in Equation (3), $$(\hat{A}, \hat{B}) \in co\{(A_i, B_i)\}_{i=1}^l \qquad (13)$$

and an additive disturbance estimate $\hat{w}$ is selected from the polyhedral set for additive disturbance in Equation (3), $$\hat{w} \in \mathcal{W}. \qquad (14)$$

The current model in Equations (13)-(14) is updated within its respective set at each time step, using the input 104, and the state 106, until the current model is in line with the observed machine motion, in terms of the sequence of the machine state values.

In one embodiment, the implementation of the model update considers the model in (13) and (14) to be linear combinations of the vertices of Equation (6) and of the vertices of W $$\hat{A}x + \hat{B}u + B_w\hat{w} = \sum_{i=1}^{\ell} [\theta]_i(A_i x + B_i u) + \sum_{i=1}^{p} [\eta]_i B_w w_i, \quad (15)$$

where $\theta$ is the combination vector of the linear models, and $\eta$ is the combination vector of the additive disturbances $$\theta \in \mathbb{R}^{\ell}, 0 \leq [\theta]_i \leq 1, \sum_i [\theta]_i^{\ell} = 1 \quad (15b)$$

$$\eta \in \mathbb{R}^{p}, 0 \leq [\eta]_i \leq 1, \sum_i [\eta]_i^{p} = 1,$$

so that a linear regression model can be formed for the joint parameter vector $$\lambda = [\theta \eta]^T. \quad (16)$$

The linear regression model takes the form $$y = \sum_{i=1}^{\ell} [\theta]_i (A_i x + B_i u) + \sum_{i=1}^{p} [\eta]_i B_w w_i + \epsilon, \quad (17)$$

$$= \Gamma(x, u)\theta + \Upsilon\eta + \epsilon,$$

$$= M^T(x, u)\lambda + \epsilon,$$

where $\epsilon$ represents measurement noise, $$\Gamma(x,u) = [A_1 x + B_1 u, \ldots, A_{\ell} x + B_{\ell} u]$$

$$\Upsilon = [B_w w_1, \ldots, B_w w_p]$$

and $$M^T(x,u) = [\Gamma(x,u)\Upsilon]. \quad (18)$$

The linear regression (17) can then be solved by several methods. For example, one embodiment uses a recursive least squares (RLS) method, modified to ensure that the output of the regression $\lambda = [\theta\eta]^T$ is in its allowed range according to (15b).

For example, the RLS method can include the solution of $$\Psi(t+1) = (I - \mathcal{K}_{RLS}(t+1)M^T(x(t),u(t)))\Psi(t)$$

$$\mathcal{K}_{RLS}(t+1) = \Psi(t+1)M(x(t),u(t)),$$

$$\hat{\lambda}(t+1) = \hat{\lambda}(t) + \mathcal{K}_{RLS}(t+1)(y(t+1) - M^T(x(t),u(t))\hat{\lambda}(t)),$$

$$\hat{\lambda}(t+1) = \text{proj}_{\lambda}(\hat{\lambda}(t+1)) \quad (18b)$$

wherein $\mathcal{K}$RLS is an estimate correction gain, $\Psi$ is an estimate covariance matrix and $\text{proj}_{\lambda}$ is the operator that projects its argument into the domain of $\lambda$.

Figure 11:
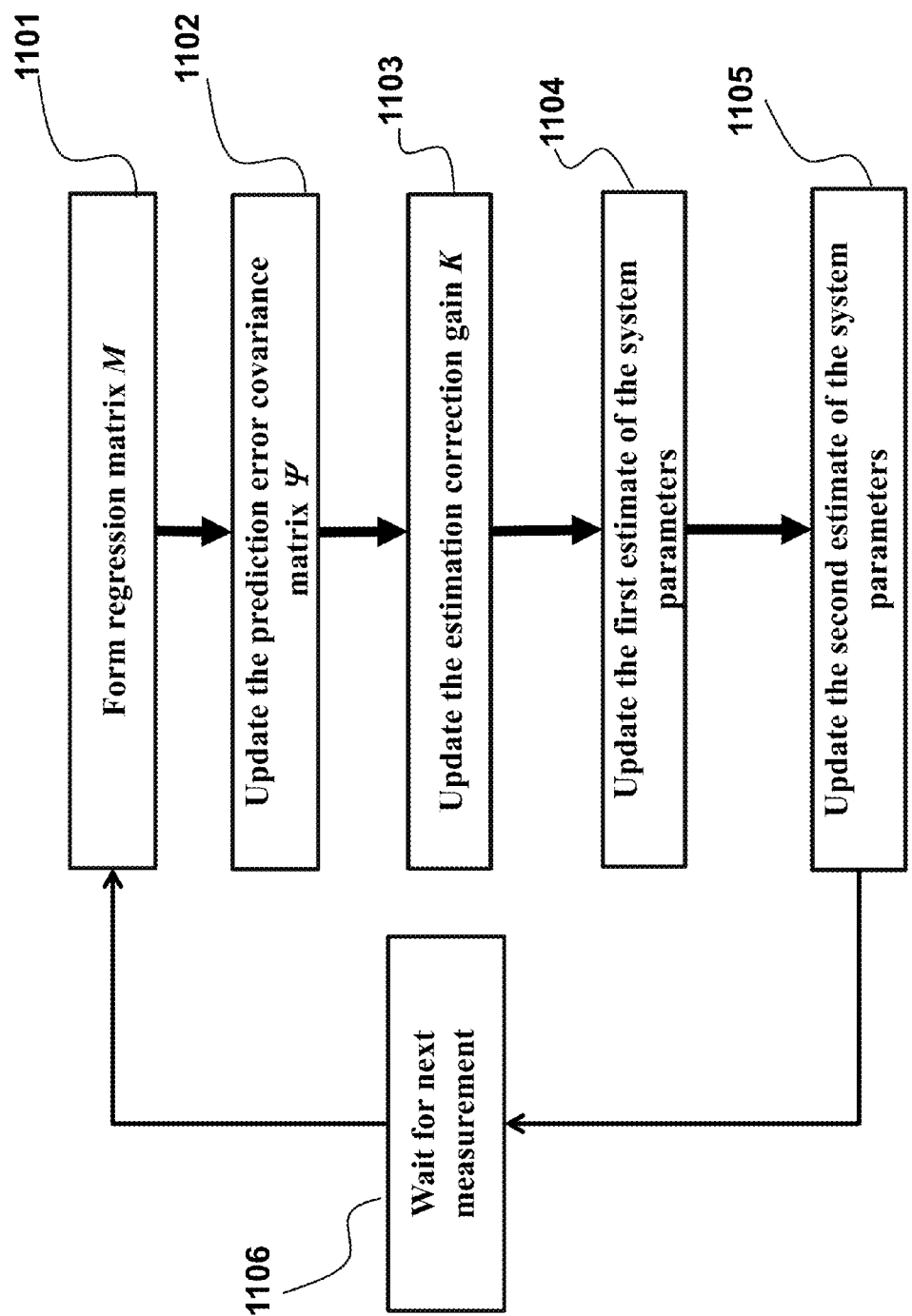
FIG. 11 is a block diagram of a method for updating the model of the machine according to one embodiment of the invention.

FIG. 11 shows a block diagram of updating the model of the machine using modified RLS according to one embodiment of the invention to produce the current model of the machine. The modified RLS at each step uses the previous input and the previous state to form 1101 the regressor matrix M, as well as the current time-step's state as the measurement Y. The modified RLS updates 1102 the prediction error covariance matrix $\psi$ and updates 1103 the estimation gain a.

Next, the modified RLS determines 1104 a first estimate of the parameters $\hat{\lambda}(t+1)$, and determines 1105 a second estimate of the parameters $\hat{\lambda}(t+1)$ by projecting the first estimate of the parameters onto the admissible range of $\lambda = [\theta\eta]^T$ as determined by (15b). Then, the modified RLS waits 1106 until the next measurement.

The second parameter estimates can be determined 1105 in a number of ways. For example, one embodiment determine the second parameter by first saturating each component of the first estimate of the parameters $\hat{\lambda} = [\hat{\hat{\theta}} \ \hat{\hat{\eta}}]^T$ between 0 and 1, and then normalizing each component of $\hat{\hat{\theta}}$ and $\hat{\hat{\eta}}$ in the first estimate of the parameters, by dividing them for the sum of the saturated components of $\hat{\hat{\theta}}$ and $\hat{\hat{\eta}}$ in the first estimate of the parameters. This results in the estimate of parameter vector (16) at the current time step, thereby giving an updated estimate of the current model in (13) and (14). In other embodiments, other regression models and/or estimation algorithms are used for updating the current model of the machine 201 based on (13) and (14).

Cost Function

In some embodiments of the invention, the cost function module 207 initialize the current cost function 209 based on a nominal cost function. In one embodiment, the nominal cost function is multifaceted and includes conflicting objectives. For example, the cost function the cost function can include a first term for determining a first value for a control input according to an objective of the operation and includes a second term for determining a second value for the control input for reducing the difference between the current state of the machine and the state estimated with the model of the machine, such that the optimization optimizes a combination of the first term and the second term, wherein the updating the cost function includes changing a weight of the second term in the combination.

In one embodiment, the cost function takes the form $$F_t(x_N) + \sum_{k=1}^{N} L_t(x_k, u_k, P_k), \quad (19)$$

where $F_t$ and $L_t$ are functions of their arguments that bias the machine's states and inputs to values that reflect the multifaceted objective, and $P_k$ is the predicted parameter error covariance matrix from the RLS algorithm. In one embodiment, the $L_t$ includes a dual objective trading regulation of the sates of the machine and objectives of the learning the parameters of the model. For example, the first term of the cost function is related to a performance of the machine, and the second term is related to improving estimation of the parameters of the model, wherein the second term is weighted by reliability of the current model of the machine measured as a nonnegative, nondecreasing function of a prediction error of the current model.

In one embodiment the function $L_t$ is $$L_t(x_k, u_k, P_k) = x_k^T Q x_k + u_k^T R u_k + \lambda(y(t) - M^T(x(t-1), u(t-1))\hat{\lambda}(t-1))\psi(P_k)$$

where $\lambda$ is a function of the residual error between the state predicted by the current model 201 and the actual measured state 106, and ψ($P_k$) is an information functional of the predicted parameter error covariance matrix.

The information functional is a measure of the information associated with the unknown parameter vector (16), examples of which include trace, determinant, and maximum eigenvalue. If the information functional is given priority in the cost function, i.e. λ is large, then the machine's states and inputs are biased towards values that improve model learning; otherwise, the states and inputs are biased towards the regulation of the machine's states.

The current cost function (19) is updated at each time step with the state predicted by the current model and the actual measured state, so that the cost function only attempts to improve the model learning when the residual error is large. For example, the second term of the cost function includes a function of the difference between the previous and the current models and the updating determines the difference between the previous and the current models and updates the second term of the cost function with the determined difference.

In another embodiment, the cost function is separated into two cost functions that are used for input computation 208, where the first cost functions is only concerned with model learning, i.e. $F_t=0$ and $L_t=\psi(P_k)$, and the second cost function forms a dual objective, trading regulation of the machine's states and penalizing deviations from the input sequence generated by application of the first cost function.

Input Computation

In some embodiments, the input computation 208 takes the form of a finite horizon numerical optimization problem, $$\min_U F_t(x_N) + \sum_{k=1}^{N} L_t(x_k, u_k, P_k), \quad (20)$$

$$\text{s.t.} \quad x_{k+1} = M^T(x_k, u_k)\lambda(t),$$

$$x_0 = x(t),$$

$$P_0 = P(t),$$

$$u_k \in C_u^\infty(x_k),$$

which is formed from the current cost function ($F_t$ and $L_t$) 207, the machine model with current parameter estimate λ 201 that predicts the evolution of the state over the horizon, the robust constraints $C_u^\infty(x_k)$ 206, and the state at the current time step x(t). The problem (20) is solved using a numerical solver, which finds the input sequence U [$u_1$ . . . $u_N$]$^T$ that minimizes the current cost function subject to the problem constraints. The first input $u_1$ in the input sequence is considered as the output of the input computation 208 and is applied to the machine 102. At the next time step, t+1 the model and cost function are updated, the state is updated, and the numerical optimization problem is solved again.

In alternative embodiment, the problem (20) is separated into two phases:
  i) a model learning phase, e.g., $L_t=\psi(P_k)$, which is only concerned with generating an input sequence that minimizes the information functional of the predicted parameter error covariance matrix, and
  ii) a control phase, which is only concerned with generating an input sequence that regulates the machine to the origin, e.g., $$L_t = x_k^T Q x_k + u_k^T R u_k.$$

The switch from the model learning phase to the control phase is based on the residual error between the state predicted by the current model 201 and the actual measured state 106, that is, when the error is below a set threshold, model learning is no longer necessary and a switch to the control phase is enacted. A switch back to the model-learning phase is enacted if the error grows beyond a set threshold.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling an operation of a machine according to a model of the machine dynamics, wherein the method uses a processor coupled with stored instructions implementing the method, wherein the instructions, when executed by the processor carry out at least some steps of the method, comprising:
   controlling iteratively the operation of the machine with control inputs determined using the model based on an optimization of a cost function subject to constraints on the control inputs, and constraints on the state of the machine, wherein the operation is controlled online over a plurality of iterations, each iteration comprises:
   determining a current state of the machine using measurements of outputs of the machine controlled with a previous control input determined for a previous iteration;
   updating a parameter of a model of the machine dynamics to reduce a prediction error between the current state and a state estimated using the model of the machine dynamics, and wherein the parameter of the model of the machine dynamics represents a physical quantity of the machine;

optimizing the cost function to produce a control input, wherein the cost function includes a first term related to a performance of the machine and a second term related to improving estimation of the parameter of the model of the machine dynamics, wherein the second term is weighted by a function of the prediction error, and wherein the second term includes an information functional of a predicted error covariance of the parameter of the model of the machine dynamics; and controlling the machine using the control input.

2. The method of claim 1, wherein the function of the prediction error is a nonnegative, nondecreasing function.

3. The method of claim 1, wherein the model of the machine dynamics includes a nominal model defining relationships among parameters of the model and an uncertainty model defining a range of values for at least one parameter of the model, and wherein the parameter of the model of the machine dynamics is updated such that the updated value of the parameter is within the range of values.

4. The method of claim 3, wherein the uncertainty model is extended such that a combination of the nominal model and the uncertainty model is included into a convex combination of linear models with a convex combinations of additive disturbances.

5. The method of claim 4, wherein the model of the machine dynamics is updated recursively such that the parameters of the model of the machine dynamics are within the convex combination of linear models and the convex combinations of additive disturbances.

6. The method of claim 4, wherein the updating the model of machine dynamics comprises:

determining a combination vector of the linear models and a combination vector of the additive disturbances;

projecting the combination vector of the linear models in the convex combination of the linear models; and projecting the combination vector of the additive disturbances in the convex combination of the additive disturbances.

7. The method of claim 3, wherein the constraints on the control inputs include control-invariant constraints on the control inputs selected such that any value of the control input satisfying the control-invariant constraints maintains a state of the machine in a control-invariant subset of states satisfying constraints on the operation of the machine, wherein for any state of the machine within the control-invariant subset there is an admissible control input satisfying the control-invariant constraints and maintaining the state of the machine within the control-invariant subset for all values of the parameter of the model of machine dynamics within the range defined by the uncertainty model.

8. The method of claim 4, wherein the constraints on the control inputs include control-invariant constraints determined from the convex combination of the linear models and the convex combination of the additive disturbances by backward reachability iterations that guarantee that for any state into a control-invariant subset of states satisfying constraints on the operation of the machine, there exists a control input such that the control-invariant constraints are satisfied during the operation for all values of the parameters of the model of the machine dynamics defined by the nominal and the uncertainty models.

9. The method of claim 3, wherein the constraints on the control inputs include stability constraints converging the state of the machine to a target value for all values of the parameters of the model of the machine dynamics defined by the nominal and the uncertainty models.

10. The method of claim 1, wherein the stability constraints include a control Lyapunov function of the machine.

11. The method of claim 10, wherein the control Lyapunov function is an infinity-norm control Lyapunov function that satisfies a feasible value reduction test for all states of the machine satisfying the control-invariant constraints comprising of:

selecting rows of a matrix describing the infinity-norm control Lyapunov function;

determining convex components of the states of the machine that satisfy, for positive and negative conditions, a feasible value reduction on the rows of the matrix describing the infinity-norm control Lyapunov function for at least one input of the machine satisfying the control-invariant constraints;

determining a union of the convex components;

verifying that all the states of the machine in the control-invariant subset of the states of the machine are contained in the union of the convex components.

12. The method of claim 1, wherein the optimization is solved by numerical optimization algorithms.

13. A method for controlling an operation of a machine according to a model of the machine dynamics including a nominal model defining relationships among parameters of the model and an uncertainty model defining a range of values for at least one parameter of the model, wherein the method uses a processor coupled with stored instructions implementing the method, wherein the instructions, when executed by the processor carry out at least some steps of the method, comprising:

controlling iteratively the operation of the machine with control inputs determined using the model of the machine dynamics based on an optimization of a cost function, wherein the optimization is subject to control-invariant constraints on the operation of the machine including constraints on the control inputs and the state of the machine, selected such that any value of the control input satisfying the control-invariant constraints maintains a state of the machine in a control-invariant subset of states satisfying constraints on the operation of the machine, wherein for any state of the machine within the control-invariant subset there is an admissible control input satisfying the control-invariant constraints and maintaining the state of the machine within the control-invariant subset for all values of the parameters of the model within the range defined by the uncertainty model, wherein the parameter of the model of the machine dynamics represents a physical quantity of the machine, wherein the operation is controlled online over a plurality of iterations, each iteration comprises:

determining a current state of the machine using measurements of outputs of the machine controlled with a previous control input determined for a previous iteration;

updating a parameter of a model of the machine dynamics to reduce a prediction error between the current state and a state estimated using the model of the machine dynamics, such that the updated value of the parameter is within the range of values;

optimizing the cost function to produce a control input, wherein the cost function includes a first term related to a performance of the machine and a second term related to improving estimation of the parameter of the model of the machine dynamics, wherein the second term is weighted by a function of the prediction error, and wherein the second term includes an information functional of a predicted error covariance of the parameter of the model of the machine dynamics; and controlling the machine using the control input.

14. A control system for controlling iteratively an operation of a machine according to a model of the machine dynamics, comprising:

a memory to store the model of the machine including a nominal model defining relationships among parameters of the model and an uncertainty model defining a range of values for at least one parameter of the model, and the constraints on the operation of the machine including constraints on the control inputs and the state of the machine, wherein the parameter of the model of the machine dynamics represents a physical quantity of the machine; and at least one processor to determine a current state of the machine using measurements of outputs of the machine;

update the parameter of the model of the machine dynamics to reduce a prediction error between the current state and a state estimated using the model of the machine dynamics, such that the updated value of the parameter is within the range of values;

optimize the cost function to produce a control input, wherein the cost function includes a first term related to a performance of the machine and a second term related to improving estimation of the parameter of the model of the machine dynamics, wherein the second term is weighted by a function of the prediction error, and wherein the second term includes an information functional of a predicted error covariance of the parameter of the model of the machine dynamics; and control the machine using the control input.

15. The control system of claim 14, wherein the constraints on the control inputs include control-invariant constraints on the control inputs selected such that any value of a control input satisfying the control-invariant constraints maintains a state of the machine in a control-invariant subset of states satisfying constraints on the operation of the machine, wherein for any state of the machine within the control-invariant subset there is an admissible control input satisfying the control-invariant constraints and maintaining the state of the machine within the control-invariant subset for all values of the parameter of the model within the range defined by the uncertainty model.

* * * * *